(12) United States Patent
Frühauf et al.

(10) Patent No.: US 12,263,499 B2
(45) Date of Patent: Apr. 1, 2025

(54) NOZZLE LANCE, COMBUSTION PLANT AND METHOD FOR EXHAUST GAS TREATMENT

(71) Applicant: RS RITTEL GMBH, Gladbeck (DE)

(72) Inventors: Peter Frühauf, Gladbeck (DE); Julian Essler, Gladbeck (DE)

(73) Assignee: RS RITTEL GMBH, Gladbeck (DE)

( * ) Notice: Subject to any disclaimer, the term of this patent is extended or adjusted under 35 U.S.C. 154(b) by 1076 days.

(21) Appl. No.: 17/262,064

(22) PCT Filed: Jul. 22, 2019

(86) PCT No.: PCT/EP2019/069665
§ 371 (c)(1),
(2) Date: Jan. 21, 2021

(87) PCT Pub. No.: WO2020/025381
PCT Pub. Date: Feb. 6, 2020

(65) Prior Publication Data
US 2021/0308701 A1 Oct. 7, 2021

(30) Foreign Application Priority Data

Aug. 3, 2018 (DE) ..................... 10 2018 006 131.1

(51) Int. Cl.
B05B 7/04 (2006.01)
B01D 53/50 (2006.01)
(Continued)

(52) U.S. Cl.
CPC .......... B05B 7/0475 (2013.01); B01D 53/504 (2013.01); B01D 53/58 (2013.01); B01J 19/0013 (2013.01); B05B 12/12 (2013.01); F01N 3/206 (2013.01); F23J 15/003 (2013.01); B01D 53/60 (2013.01); F01N 3/2066 (2013.01); F01N 3/208 (2013.01); F01N 2610/02 (2013.01);
(Continued)

(58) Field of Classification Search
CPC combination set(s) only.
See application file for complete search history.

(56) References Cited

U.S. PATENT DOCUMENTS 4,462,543 A 7/1984 Yam
4,893,752 A 1/1990 Spink et al.
(Continued)

FOREIGN PATENT DOCUMENTS

CA 2028384 C 5/1998
CA 2123056 C 10/2005
(Continued)

OTHER PUBLICATIONS

Notice of Allowance for U.S. Appl. No. 16/482,745, mailed May 17, 2021.
(Continued)

Primary Examiner — Binh Q Tran
(74) Attorney, Agent, or Firm — Jason H. Vick; Amped IP LLC

(57) ABSTRACT

A nozzle lance for exhaust gas treatment, a combustion plant with nozzle lances for exhaust gas treatment and a method for exhaust gas treatment in a combustion plant are proposed, wherein an admixing fluid is admixed to the active fluid in the nozzle lance and atomized via three nozzles.

16 Claims, 10 Drawing Sheets

Figure 1:
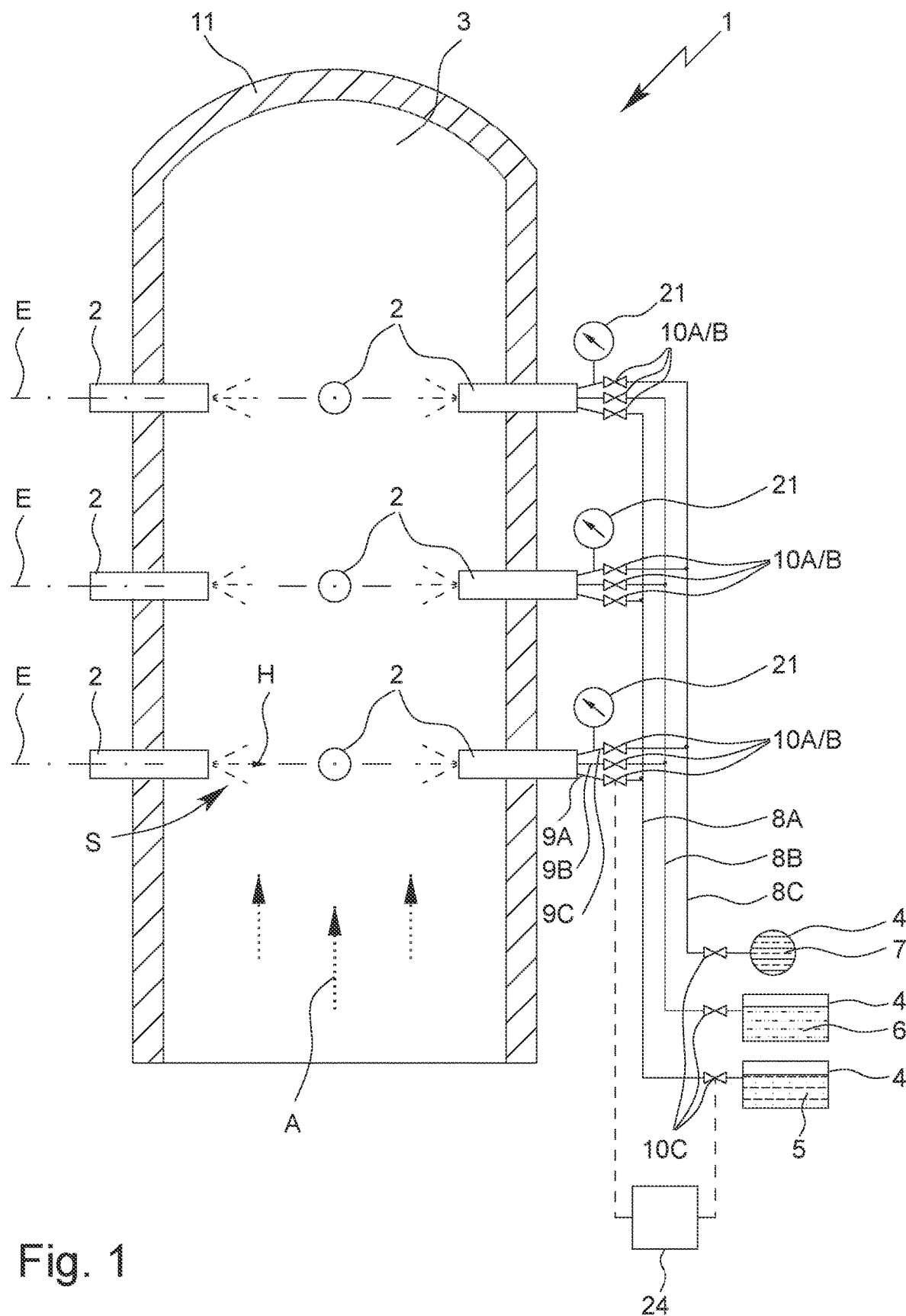

(51) Int. Cl.

| | | |
|---|---|---|
| *B01D 53/58* | (2006.01) | |
| *B01D 53/60* | (2006.01) | |
| *B01J 19/00* | (2006.01) | |
| *B05B 12/12* | (2006.01) | |
| *F01N 3/20* | (2006.01) | |
| *F23J 15/00* | (2006.01) | |

(52) U.S. Cl.
CPC ............... *F01N 2900/1404* (2013.01); *F01N 2900/1411* (2013.01); *F01N 2900/1811* (2013.01); *F01N 2900/1812* (2013.01); *F01N 2900/1818* (2013.01)

(56) References Cited

U.S. PATENT DOCUMENTS

| | | | |
|---|---|---|---|
| 4,963,329 | A | 10/1990 | Burgess et al. |
| 4,963,330 | A | 10/1990 | Johansson et al. |
| 5,474,235 | A | 12/1995 | Cole et al. |
| 5,478,542 | A | 12/1995 | Chawla et al. |
| 5,484,107 | A | 1/1996 | Holmes |
| 5,536,482 | A | 7/1996 | Diep et al. |
| 5,676,071 | A | 10/1997 | Horler et al. |
| 7,588,199 | B2 | 9/2009 | Huffman |
| 8,980,206 | B2 | 3/2015 | Hamel et al. |
| 9,168,545 | B2 | 10/2015 | Vidusek et al. |
| 9,889,406 | B2 | 2/2018 | Itoh et al. |
| 10,760,789 | B2 | 9/2020 | Hilber et al. |
| 2003/0109047 | A1 | 6/2003 | Valentine |
| 2005/0002841 | A1 | 1/2005 | Moberg |
| 2008/0202397 | A1* | 8/2008 | Torbov ............ B01D 53/79 423/242.1 |
| 2009/0112363 | A1* | 4/2009 | Jambhekar ......... B01D 53/9431 700/266 |
| 2009/0121038 | A1 | 5/2009 | Wurz |
| 2011/0150709 | A1 | 6/2011 | Neu et al. |
| 2014/0134086 | A1 | 5/2014 | Hamel et al. |
| 2014/0308186 | A1 | 10/2014 | Messineo et al. |
| 2014/0356236 | A1 | 12/2014 | Yamakaji et al. |
| 2015/0231567 | A1* | 8/2015 | Golin ............... F01N 3/2066 422/172 |
| 2016/0053643 | A1* | 2/2016 | Fan ................. F01N 3/0233 60/297 |
| 2017/0058742 | A1* | 3/2017 | Zhang .............. F01N 3/2066 |
| 2017/0182442 | A1* | 6/2017 | Kippel ............. B01D 46/444 |
| 2019/0351370 | A1 | 11/2019 | Frühauf |
| 2020/0378275 | A1* | 12/2020 | Jo ................... F01D 25/305 |

FOREIGN PATENT DOCUMENTS

| | | |
|---|---|---|
| CA | 2224582 C | 11/2005 |
| CN | 105318350 A | 2/2016 |
| CN | 205598951 U | 9/2016 |
| CN | 106050368 A | 10/2016 |
| CN | 109395563 A | 3/2019 |
| DE | 3935400 C1 | 8/1990 |
| DE | 4130348 A1 | 3/1993 |
| DE | 10359150 A1 | 7/2005 |
| DE | 102008036009 A1 | 10/2009 |
| DE | 102008036099 A1 | 2/2010 |
| DE | 102012110962 A1 | 5/2014 |
| EP | 0079081 A2 * | 5/1983 |
| EP | 2463015 A1 | 6/2012 |
| EP | 2962743 A1 | 1/2016 |
| JP | H07-502194 A | 3/1995 |
| JP | 2003-265924 A | 9/2003 |
| KR | 2003-0035617 A | 5/2003 |
| WO | WO 93/12036 A | 6/1993 |
| WO | WO 01/16022 A1 | 3/2001 |
| WO | WO 2006/119923 | 11/2006 |
| WO | WO 2011/077523 | 6/2011 |
| WO | WO 2018/141486 | 8/2018 |

OTHER PUBLICATIONS

Shen, Jian et al. "Review Textbook for Professional Examination of Registered Environmental Engineer (The First Volume)" (Including Translation) China Environmental Science Press; May 2007.
Invitation to Pay Additional Fees and, Where Applicable, Protest Fee for International Application No. PCT/EP2018/025028, mailed Apr. 6, 2018.
International Search Report for International Application No. PCT/EP2018/025028, mailed Jun. 29, 2018.
Written Opinion for International Application No. PCT/EP2018/025028, mailed Jun. 29, 2018.
International Preliminary Report on Patentability for International Application No. PCT/EP2018/025028, mailed Aug. 15, 2019.
International Preliminary Report on Patentability for International Application No. PCT/EP2019/069665, mailed Feb. 18, 2021.
Office Action for U.S. Appl. No. 16/482,745, mailed Feb. 10, 2021.
Invitation to Pay Additional Fees and, Where Applicable, Protest Fee for International Application No. PCT/EP2019/069665, mailed Oct. 24, 2019.
International Search Report for International Application No. PCT/EP2019/069665, mailed Dec. 18, 2019.
Written Opinion for International Application No. PCT/EP2019/069665, mailed Dec. 18, 2019.

* cited by examiner

NOZZLE LANCE, COMBUSTION PLANT AND METHOD FOR EXHAUST GAS TREATMENT

CROSS REFERENCE TO RELATED APPLICATIONS

This application is a national stage application under 35 U.S.C. 371 of PCT Application No. PCT/EP2019/069665 having an international filing date of 22 Jul. 2019, which designated the United States, which PCT application claimed the benefit of German Application No. 10 2018 006 131.1, filed 3 Aug. 2018, each of which are incorporated herein by reference in their entirety.

The present invention relates to a nozzle lance for exhaust gas treatment, a use of a nozzle lance, a combustion plant, a method for exhaust gas treatment, and a use of measuring devices and/or thermometers in a combustion plant according to the claims as appended hereto.

In the present invention, the term "nozzle lance" is preferably to be understood as a device by means of which a fluid can be supplied to an exhaust gas chamber, in particular for exhaust gas treatment, preferably wherein the fluid is sprayed or atomized into the exhaust gas chamber or is delivered to the exhaust gas chamber as an aerosol or spray. For this purpose, the nozzle lance preferably passes through a wall of the exhaust chamber, especially horizontally.

Such nozzle lances are preferably used for exhaust gas treatment in larger combustion plants, especially large combustion plants.

A "combustion plant" or "large combustion plant" in the sense of the present invention is preferably a particularly stationary facility for the combustion of any materials, preferably on a large scale, e.g. waste incineration plant, a power station or a furnace.

In the present invention, the term "exhaust gas treatment" preferably refers to the treatment or cleaning of exhaust gases, in particular in combustion plants. In general, the (chemical) composition of the exhaust gas can be changed or influenced by exhaust gas treatment. In particular, chemical compounds can be converted into other chemical compounds by chemical reactions and thus certain chemical compounds can be (at least partially) removed from the exhaust gas.

Combustion in combustion plants produces exhaust gases with a large number of pollutants, especially toxic ones, which require cleaning of the exhaust gas. In particular, the permitted amount of pollutants in the exhaust gas is regulated by law in many countries, in the Federal Republic of Germany for example by the Federal Immission Control Act or the Ordinance for the Implementation of the Federal Immission Control Act.

Pollutants within the meaning of the present invention are in particular nitrogen oxides and/or sulphur oxides.

In the present invention, the term "exhaust gas treatment" is preferably understood to mean exhaust gas cleaning, particularly preferably flue gas denitrification and/or flue gas desulphurization. In flue gas denitrification, nitrogen oxides $NO_x$, in particular NO and/or $NO_2$, are at least partially removed from the exhaust gas or flue gas produced during combustion. In flue gas desulphurization, sulphur-containing compounds or sulphur oxides, in particular $SO_2$ and/or $SO_3$, are at least partially removed from the exhaust gas or flue gas produced during combustion.

It is known that the removal of nitrogen oxides from the exhaust gas can be achieved by a chemical reaction. By adding ammonia ($NH_3$) or an ammonia solution, in which ammonia is dissolved in water, to the exhaust gas containing nitrogen oxides, the nitrogen oxides from the exhaust gas can react with oxygen and the ammonia solution, so that nitrogen ($N_2$) and water ($H_2O$) are formed as products of the reaction. It is also possible to use a urea solution instead of an ammonia solution for denitrification.

In a similar way, sulphur oxides can be removed from an exhaust gas containing sulphur oxides by adding calcium oxide or calcium carbonate, especially dissolved in water, by means of a chemical reaction.

According to the present invention, an active fluid—i.e. a fluid with an active substance such as ammonia or urea or a calcium-containing compound—is injected or atomized into the exhaust gas for exhaust gas treatment or cleaning.

In the following, the present invention is explained primarily in connection with flue gas denitrification as a preferred example of exhaust gas treatment. However, the present invention is also suitable for flue gas desulfurization in an analogous manner.

The term "atomization" preferably refers to the conversion of one or more fluids into a spray or aerosol. The atomization is preferably carried out through a nozzle, in particular wherein a nozzle is a component with a changing, in particular reducing, cross-section along the flow direction of the fluid.

The discharge of the spray or fluid from the nozzle lance and/or into an exhaust gas chamber is also referred to in the following as "injection". In particular, the terms "injection" and "discharge" or equivalent terms are synonymous and preferably interchangeable.

Preferably, the active fluid to be atomized is liquid and is atomized by means of pressurized gas. In this way, a spray or aerosol with a large number of droplets of the atomized liquid fluid or active fluid is formed or emitted into the exhaust gas.

In known combustion plants, a premixed ammonia solution or other suitable liquid is added to the exhaust gas by means of nozzle lances for exhaust gas cleaning or flue gas denitrification.

The combustion plants have a tank for the ammonia solution as the active fluid and a tank for an admixing fluid, for example water. For admixing, the active fluid and the admixing fluid are mixed in a desired ratio to produce a fluid mixture with a certain concentration of the ammonia contained in the active fluid as the active substance. This fluid mixture is then fed to the nozzle lances via a common supply line. This does not allow an optimal exhaust gas treatment, especially with regard to the increasing requirements or lower limit values.

DE 10 2008 036 009 A1 discloses a device for denitrification of flue gases with injection lances for blowing ammonia water or urea into an interior of a steam generator. The injection lances are arranged at different levels and all injection lances have a shut-off valve. The shut-off valves can be controlled individually by a central control unit.

From DE 103 59 150 A1, a lance is known in which liquid urea is mixed with a carrier gas in a mixing zone before it is dosed into an exhaust gas stream.

US 2005/0002841 A1 discloses an injection system for exhaust gas treatment, wherein the system has several coaxially arranged pipes. An active fluid to be atomized is passed through one of the pipes and after leaving the line is atomized with a gas supplied through another pipe.

DE 10 2012 110 962 A1 discloses a multi-substance nozzle for injecting a reaction agent into a combustion chamber. The nozzle has three coaxially arranged tubes for the reactant, a blowing agent and a coating agent. At the outlet of the nozzle the reactant and the blowing agent are atomized. The arrangement of the pipes is intended to ensure that the atomized reactant and propellant are coated by the coating agent after leaving the nozzle.

From U.S. Pat. No. 5,484,107, a three-fluid atomizer is known. The atomizer has three supply lines for different fluids. In the atomizer, two fluids, especially liquids, are first brought together before they enter a mixing chamber where they are mixed with the third fluid, preferably a gas. The fluid mixture is then atomized through one or more nozzle openings of a nozzle head.

From EP 2 463 015 A1, a spray lance for spraying a $NH_4Cl$ solution into a flue gas line is known. The spray lance has a double-tube structure in which an inner tube for the $NH_4Cl$ solution is surrounded by an outer tube for air supply. Furthermore, a method is known from EP 2 463 015 A1, in which the flow rate of the flue gas is measured and, depending on this, the flow rate of the sprayed $NH_4Cl$ solution is adjusted. An $NO_x$ concentration measuring device is also provided at a wet desulphurization unit downstream of the flue gas line, whose measured values are taken into account when controlling the spray lance.

From U.S. Pat. No. 5,676,071, a method for introducing a liquid treatment medium into a flue gas flow for denitrification of the flue gas is known. The treatment medium, which consists of an active substance and a carrier medium (e.g. water), is introduced into a flow chamber through which the flue gas flows by means of several spray lances. The volume flow of the introduced treatment medium is kept constant, but the proportion of the active substance can be adapted to the temperature and the flow velocity of the flue gas. If the measured temperature is outside a certain range, the lances are deactivated so that no treatment medium is sprayed.

From EP 2 962 743 A1, a method for controlling $NO_x$ emissions of a boiler by means of SNCR (selective non-catalytic reduction) is known. The boiler has sensors for (indirect) determination of a $NO_x$ concentration of a combustion gas, for example a temperature sensor or an acoustic sensor. Depending on a measured temperature, the mass flow of a sprayed reagent (e.g. urea or ammonia) can be adjusted. For example, a higher mass flow is set at a higher temperature and a lower mass flow at a lower temperature.

From DE 39 35 400 C1, a method for introducing a treatment medium into the exhaust gas stream in combustion processes is known. By means of a control system, the flow rate of the treatment medium, which is intended for introduction into a combustion chamber, is adjusted. The control is carried out depending on the $NO_x$ concentration in the flue gas of a flue gas exhaust or depending on the exhaust gas volume flow.

From DE 41 30 348 A1, a method for injecting liquids or gases into the flue gas stream of a fossil fuel-fired steam generator through several lances is known. The lances are each equipped with a temperature measuring device which is connected to a shut-off valve of the lances. The $NO_x$ content of the flue gas is measured continuously. Based on this measurement, the required amount of reducing agent is injected through the lances by means of the control valve. The temperature measuring devices control the shut-off valves in such a way that the reducing agent is only injected in an optimal temperature zone.

It is an object of the present invention to make possible an optimized exhaust gas treatment.

The above object is solved by a nozzle lance, the use of the nozzle lance, a combustion plant, a method or the use of a measuring device according to the claims as appended hereto. Advantageous further aspects are subject of the subclaims.

A nozzle lance according to the proposal serves for the atomization of an active fluid by means of pressurized gas for exhaust gas treatment, especially in a combustion plant. The nozzle lance has several supply lines and a nozzle head which is arranged at one axial end of the nozzle lance.

According to one aspect of the present invention, it is provided that the nozzle head has or forms three nozzles, wherein the main discharge directions of a first and second of the three nozzles lie in a common plane and the main discharge direction of a third of the three nozzles is oblique to said plane. In this way, the zone sprayed by the nozzle lance is increased compared to a nozzle lance or nozzle head with only one nozzle, thus enabling efficient or effective exhaust gas treatment.

According to another aspect, the nozzle head has or forms at least two nozzles, each of which has or forms its own feed for feeding the pressurized gas to the active fluid inside the nozzles. One the one hand, this increases the zone sprayed by the nozzle lance and, on the other hand, this ensures optimum atomization.

The third nozzle is preferably arranged centrally or symmetrically between the first and second nozzle. This is conducive to an optimal or even distribution of the active fluid in the zone sprayed by the nozzle lance.

The main discharge directions of the nozzles preferably run diagonally or at an acute angle to a longitudinal axis of the nozzle lance, especially where the main discharge directions of the nozzles intersect the longitudinal axis of the nozzle lance. This is conducive to an optimum distribution of the atomized active fluid.

The angle of the main discharge direction to the longitudinal axis of the nozzle lance is preferably at least 8°, particularly preferably at least 11°, and/or at most 20°, particularly preferably at most 15°. It has been shown that in this value range the best compromise between a large zone sprayed by the nozzle lance and the avoidance of direct spraying of the walls of an exhaust chamber with active fluid is achieved.

The nozzles preferably form outlets of a common atomization zone or are fluidically connected to a common atomization zone, in particular so that the same fluid mixture emerges or is atomized through each of the three nozzles when the nozzle lance is operated. This is conducive to simple control and/or feedback-control of the nozzle lance.

Preferably, the nozzle lance has three feed lines and/or the admixing fluid is admixable to the active fluid in the nozzle lance.

In this way, it is in particular possible to set or adjust the admixture locally or individually for a single or each nozzle lance. Accordingly, this makes possible an optimized exhaust gas treatment or exhaust gas cleaning.

Preferably, the nozzle lance is designed so that the active fluid is mixed with the admixing fluid inside the nozzle lance and/or shortly before the atomization or injection of the fluid mixture of active fluid and admixing fluid. In particular, mixing directly before atomization allows a very short dead time for adapting the mixing ratio of proportioning fluid and active fluid to a change in the conditions in the exhaust gas chamber, for example a change in temperature and/or pollutant concentration.

According to a further aspect, which can also be realized independently, the present invention concerns the use of a nozzle lance for exhaust gas treatment in a combustion plant.

A proposed combustion plant, in particular a large combustion plant, has several nozzle lances assigned to a common exhaust gas chamber for atomizing an active fluid by means of pressurized gas for exhaust gas treatment. In particular, the nozzle lances atomize the active fluid into a common exhaust gas chamber during operation of the combustion plant.

According to one aspect, one or more nozzle lances of a combustion plant have three nozzles each, with the main discharge directions of two of the three nozzles being perpendicular to a main flow direction of the exhaust gas and a main discharge direction of a third of the three nozzles being oblique to the main flow direction of the exhaust gas. This is conducive to efficient exhaust gas treatment and a reduction of the dead space volume, i.e. the region in the exhaust gas chamber not sprayed by the nozzle lances.

Particularly preferably, the main discharge directions of two of the three nozzles are horizontal and the main discharge direction of the third nozzle is inclined downwards with respect to the vertical.

According to another aspect, which can also be realized independently, the exhaust gas chamber has an angular cross-section, wherein at least one nozzle lance is arranged in a corner of the exhaust gas chamber and runs at an angle to wall sections of the exhaust gas chamber adjoining the corner. This is conducive to a reduction of the dead space volume and an efficient exhaust gas treatment.

The combustion plant preferably has at least one measuring device for determining a pollutant concentration in the exhaust gas. Particularly preferably, this measuring device is a lambda sensor. This makes possible an adaptation of the atomized active fluid to the pollutant concentration in the exhaust gas or an efficient exhaust gas treatment or exhaust gas cleaning.

Preferably, the proposed combustion plant has fluidically separate supply lines for the admixing fluid and the active fluid, in particular wherein the admixing fluid can be admixed to the active fluid directly in front of or in the nozzle lance. In this way it is in particular possible to set or adapt the admixing locally or individually for a single nozzle lance or each nozzle lance. This enables correspondingly optimized exhaust gas treatment or exhaust gas cleaning.

Alternatively or additionally, the proposed combustion plant has a control system with which the inflows of the active fluid, admixing fluid and/or pressurized gas for individual nozzle lances and/or nozzle lance groups (i.e. several nozzle lances) can be adjusted independently of other nozzle lances. This makes it possible, in particular, to adjust or adapt the admixing locally or individually for a single nozzle lance or each nozzle lance. This enables an optimized exhaust gas treatment or exhaust gas cleaning.

According to a further aspect, which can also be realized independently, the present invention relates to a combustion plant with an exhaust gas chamber and several nozzles or nozzle lances for the injection of a fluid by means of pressurized gas for exhaust gas treatment. The combustion plant comprises a control system for controlling the exhaust gas treatment and (at least) one thermometer for measuring a temperature in the exhaust gas chamber and/or (at least) one measuring device for determining a pollutant concentration in the exhaust gas chamber. The control system is preferably designed to control the exhaust gas treatment or the injection or mixing of the fluid in dependence on the temperature measured by the thermometer and/or the pollutant concentration determined by the measuring device. In this way, a particularly efficient and effective exhaust gas treatment or exhaust gas cleaning is possible.

In particular, the combustion plant or the control system is designed to adjust or control the quantity and/or concentration of the active fluid and/or the active substance on the basis of or in dependence of or on the basis of the temperature, measured in particular by the thermometer, and/or the pollutant concentration determined by means of the measuring device. In particular, the combustion plant and/or the control system are designed to set, control or feedback-control the mixing ratio between active fluid and admixing fluid and/or the concentration or (absolute) quantity of the active substance in the atomized fluid mixture as a function of the measured temperature and/or the pollutant concentration determined by means of the measuring device.

According to a preferred aspect, the combustion plant has several thermometers and/or measuring devices for determining a pollutant concentration and/or the combustion plant is designed to measure the temperature and/or pollutant concentration in different areas, such as sectors and/or planes, of the exhaust gas chamber, in particular independently of each other. This enables a particularly precise adjustment of the injected fluid to the conditions prevailing in the exhaust gas chamber, especially if the quantity and/or concentration of the active substance introduced by the fluid is controlled or adjusted accordingly in the sectors independently, so that a particularly effective and efficient exhaust gas cleaning is possible.

The combustion plant is preferably designed to change or adjust the quantity or concentration of the active substance in the fluid or fluid mixture being atomized or discharged into the exhaust gas chamber in less than five seconds, preferably less than one second, in particular less than 0.1 s, particularly preferably less than 0.01 s, i.e. with a very short dead time, after the measurement of the temperature and/or pollutant concentration. This allows a very fast adaptation and thus a very efficient and effective exhaust gas cleaning.

According to another aspect, which can also be realized independently, the present invention relates to a method for exhaust gas treatment, wherein a fluid is injected by means of pressurized gas through several nozzles or nozzle lances into a common exhaust gas chamber of a combustion plant. Preferably, in this method a temperature and/or a pollutant concentration is measured in the exhaust gas chamber and a quantity or concentration of the active substance in the atomized fluid or fluid mixture is adjusted or controlled as a function of the measured temperature and/or pollutant concentration. The total quantity and/or the volume flow of the atomized fluid, the mixing ratio between active fluid and admixing fluid and/or the pressure of the pressurized gas are preferably varied continuously/steplessly, especially in a temperature range of the exhaust gas between 850° C. and 1,150° C. This enables an optimized exhaust gas treatment.

Preferably, the dead time during variation is less than 5 s, preferably less than 1 s, especially less than 0.1 s, especially preferably less than 0.01 s. This is conducive to efficient or effective exhaust gas treatment.

According to a further aspect which can also be realized independently, the present invention relates to the use of one or more measuring devices and/or thermometers for determining a pollutant concentration, a temperature, a flow velocity and/or a volume flow during an exhaust gas treatment in the exhaust gas chamber of an combustion plant, wherein an active substance is injected into the exhaust gas chamber by means of one or more nozzle lances, and wherein the injected amount of active substance is adapted to the measured values measured with the measuring devices with a dead time of less than 5 s, preferably less than 1 s, in particular less than 0.1 s, particularly preferably less than 0.01 s, or, as the case may be, is adapted to the measured values measured with the measuring devices with a dead time of less than 5 s, preferably less than 1 s, in particular less than 0.1 s, particularly preferably less than 0.01 s. controlled or feedback-controlled in dependence on these measured values. This is conducive to an optimized exhaust gas treatment.

The active fluid and the admixing fluid are preferably supplied to the nozzle lances separately, wherein the admixing fluid is admixed to the active fluid in or directly in front of the nozzle lances. In this way, it is in particular possible to adjust or adapt the admixing locally or individually for a single or each nozzle lance. This makes possible an optimized exhaust gas treatment or exhaust gas cleaning.

Alternatively or additionally, in a method according to the proposal, the inflows of the admixing fluid, active fluid and/or pressurized gas for individual or several nozzle lances are adjusted independently of other nozzle lances. In this way, it is possible in particular to set or adapt the admixture locally or individually for a single or each nozzle lance. This makes possible an optimized exhaust gas treatment or exhaust gas cleaning.

Preferably, the amount or concentration of the active substance is adjusted depending on the temperature, in particular is increased if the temperature rises. However, this is preferably done (only) in one (first) temperature range, preferably between about 800° C. and about 980° C. In this way, in particular, the injection of excess active substance and thus contamination of the combustion plant or exhaust gas chamber can be avoided.

Alternatively or additionally, the amount or concentration of the active substance can be kept at least essentially constant as the temperature rises. Preferably, this is done in a second temperature range, which in particular is different from the first temperature range and/or does not overlap with the first temperature range or adjoins the first temperature range. Preferably, the second temperature range extends from about 980° C. to about 1,040° C. This enables an optimized exhaust gas treatment.

Alternatively or additionally, when a limit temperature is reached or exceeded, the amount or concentration of the injected active substance is reduced. It is also possible that no active substance is injected when the limit temperature is reached or exceeded. The limit temperature is preferably at least about 980° C., preferably at least about 1,000° C., particularly preferably at least about 1,040° C. In this way, it is possible to prevent the active substance from burning or oxidizing and leading to increased pollutant emissions from the combustion plant instead of reducing the pollutant emissions.

It can be advantageous if the total quantity of the fluids supplied to the nozzles or nozzle lances or the volume flow of the atomized fluid or fluid mixture is kept at least essentially constant. Preferably, the total quantity of the fluids supplied to the nozzles or nozzle lances or the volume flow of the atomized fluid or fluid mixture is independent of the measured temperature and/or independent of the mixing ratio between admixing fluid and active fluid and/or independent of the quantity or concentration of the active substance. This is conducive to an optimized exhaust gas treatment.

The above-mentioned features of the present invention as well as the aspects and features of the present invention resulting from the claims and the following description can basically be realized independently of each other, but also in any combination.

Further aspects, advantages, features and properties of the present invention result from the claims and the following description of preferred embodiments based on the drawing.

Figure 2:
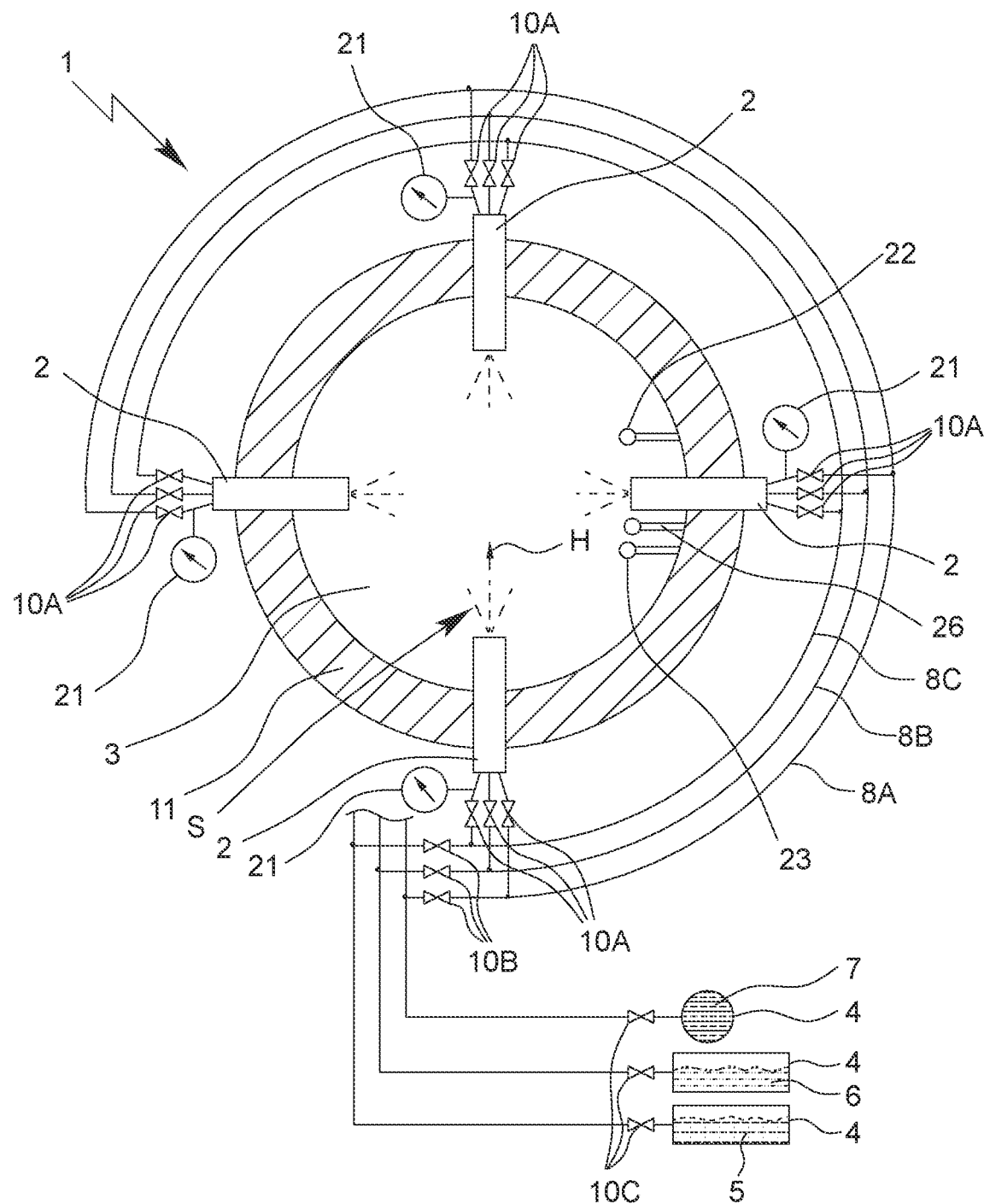
Figure 3:
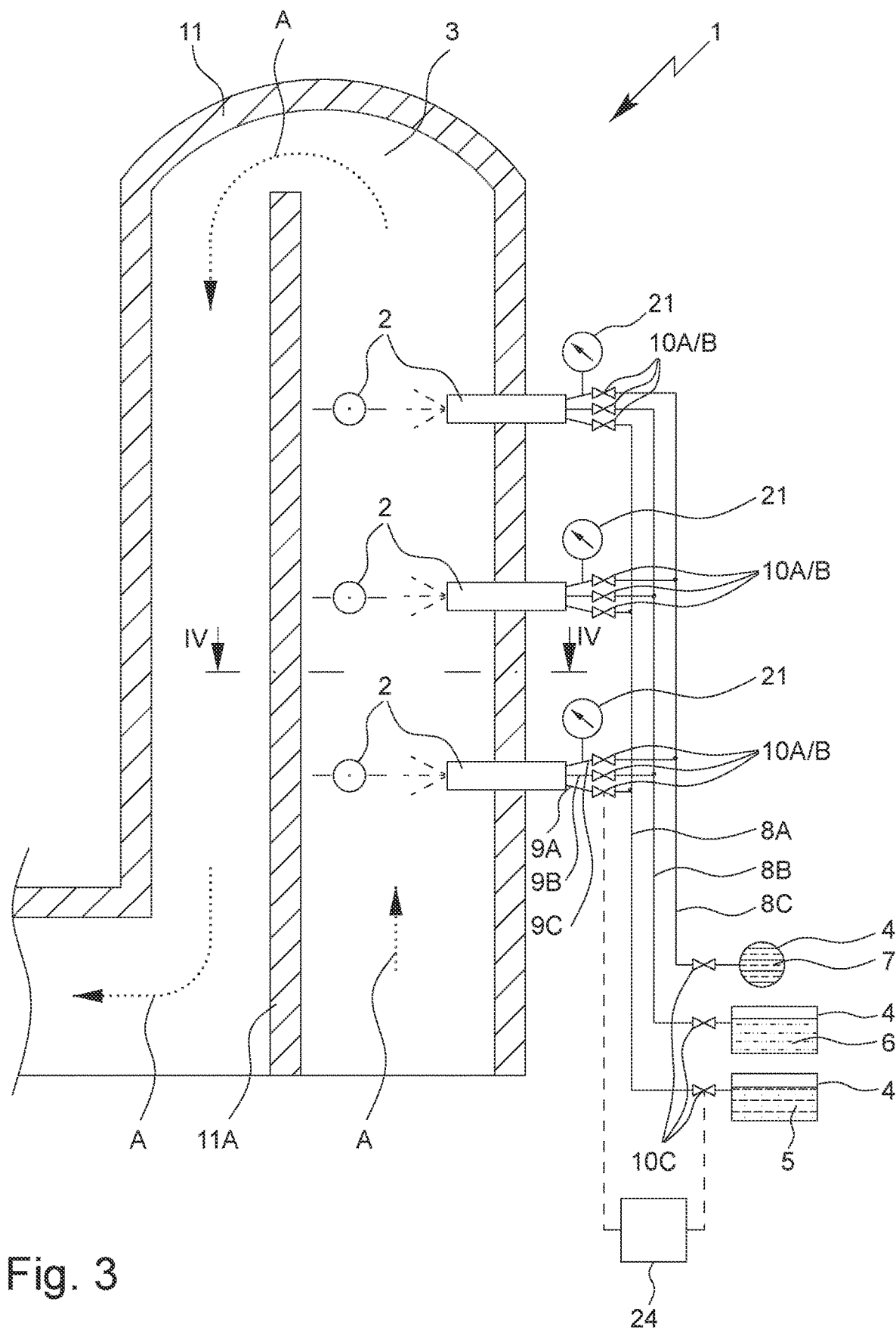
Figure 4:
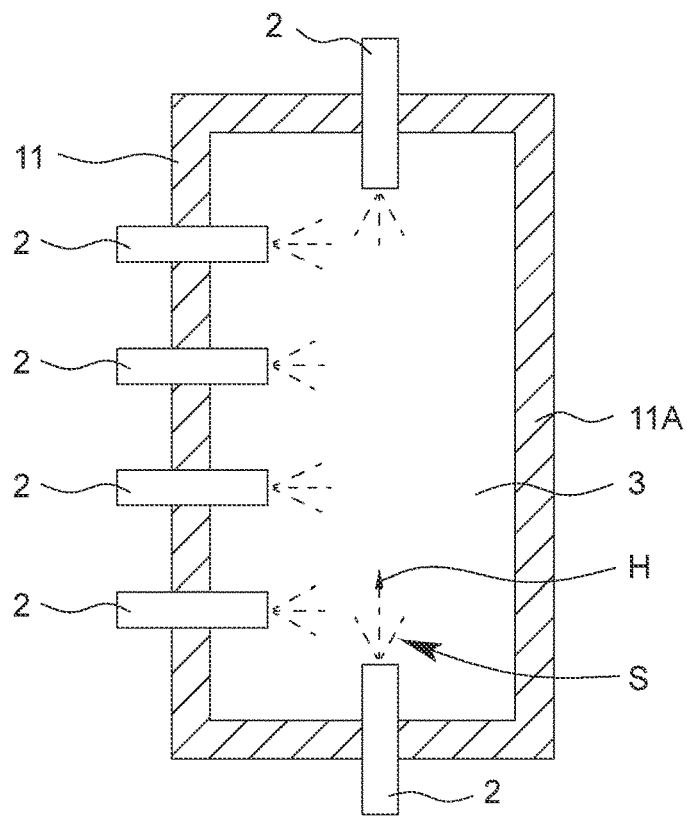
Figure 5:
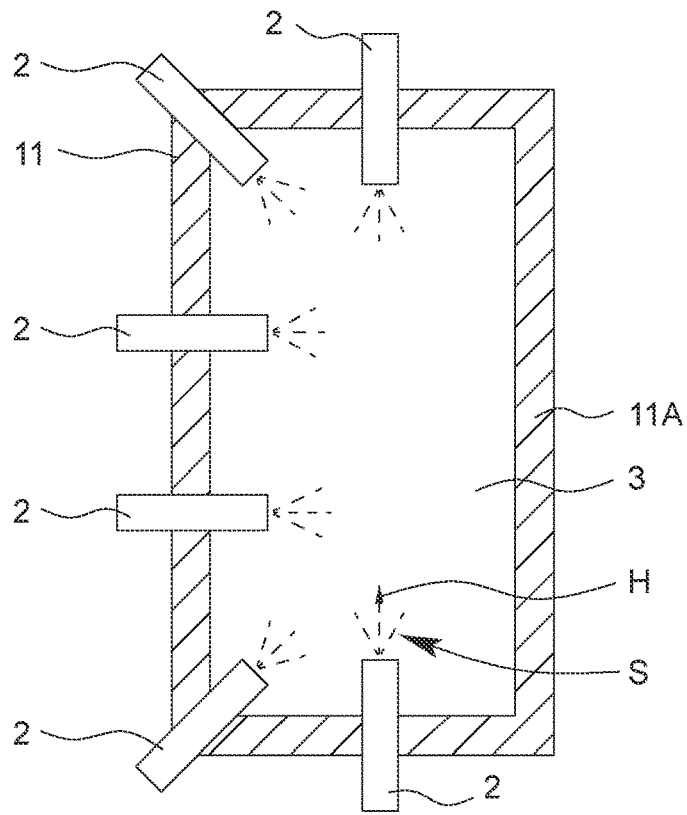
Figure 6:
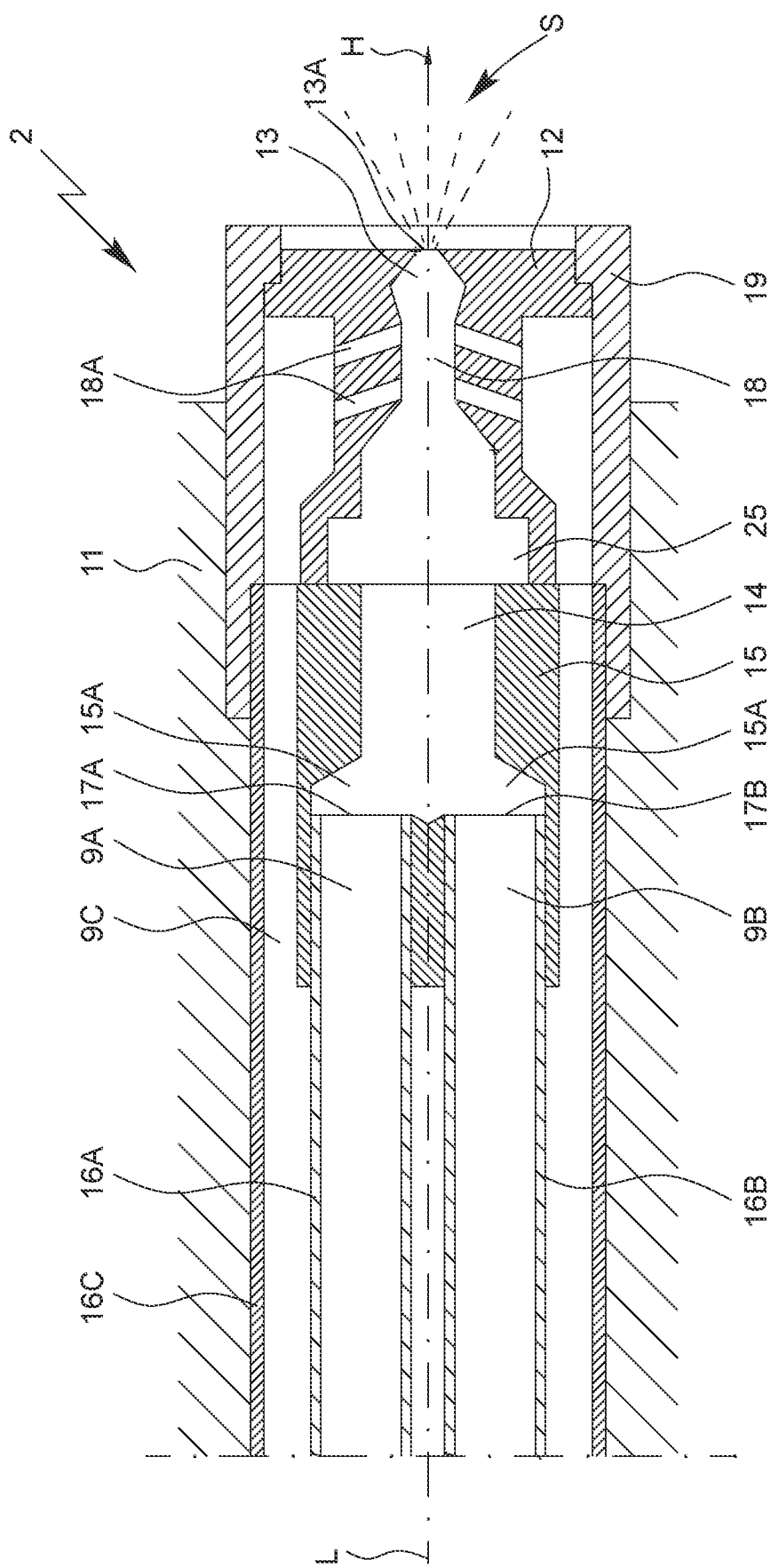
Figure 7:
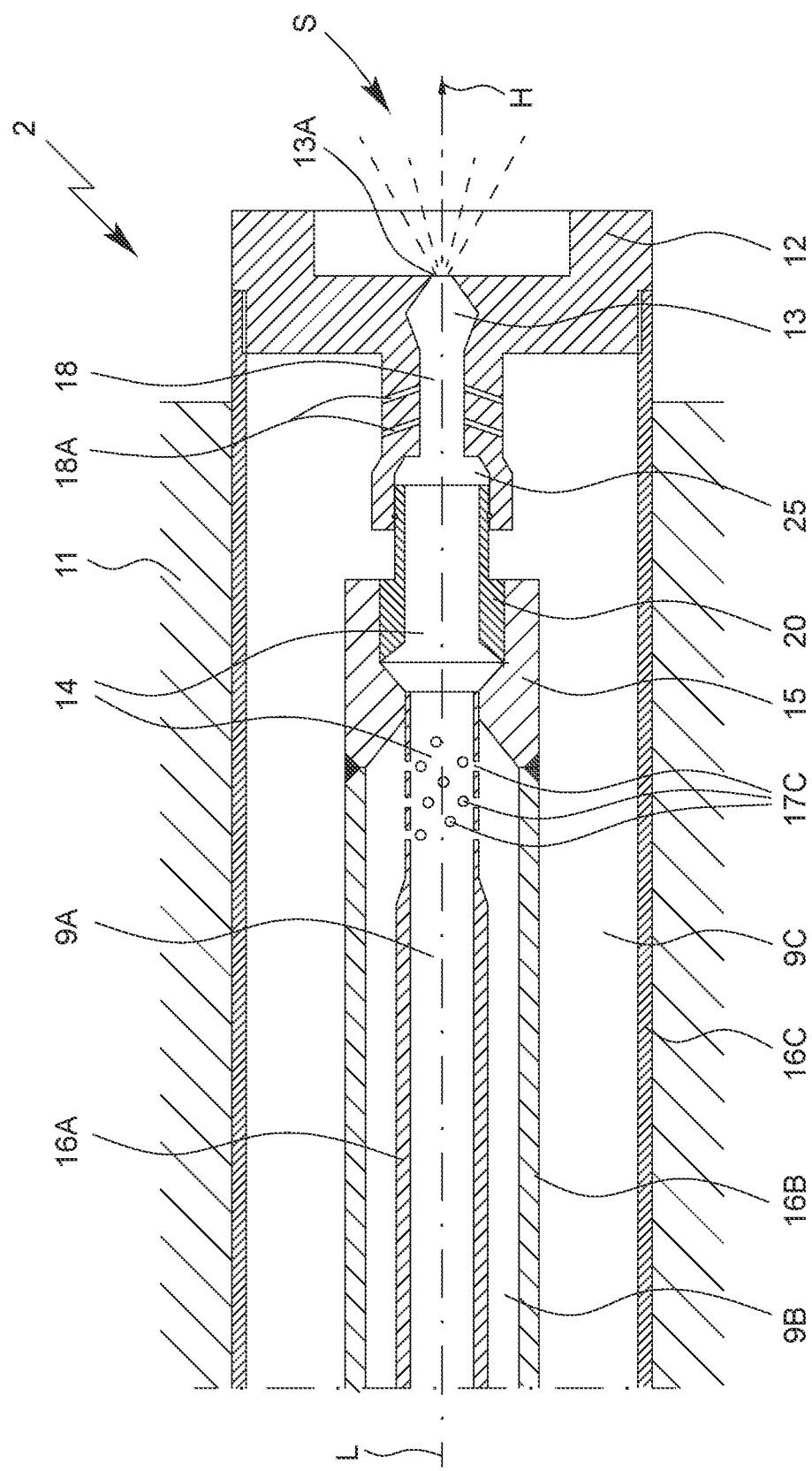
Figure 8:
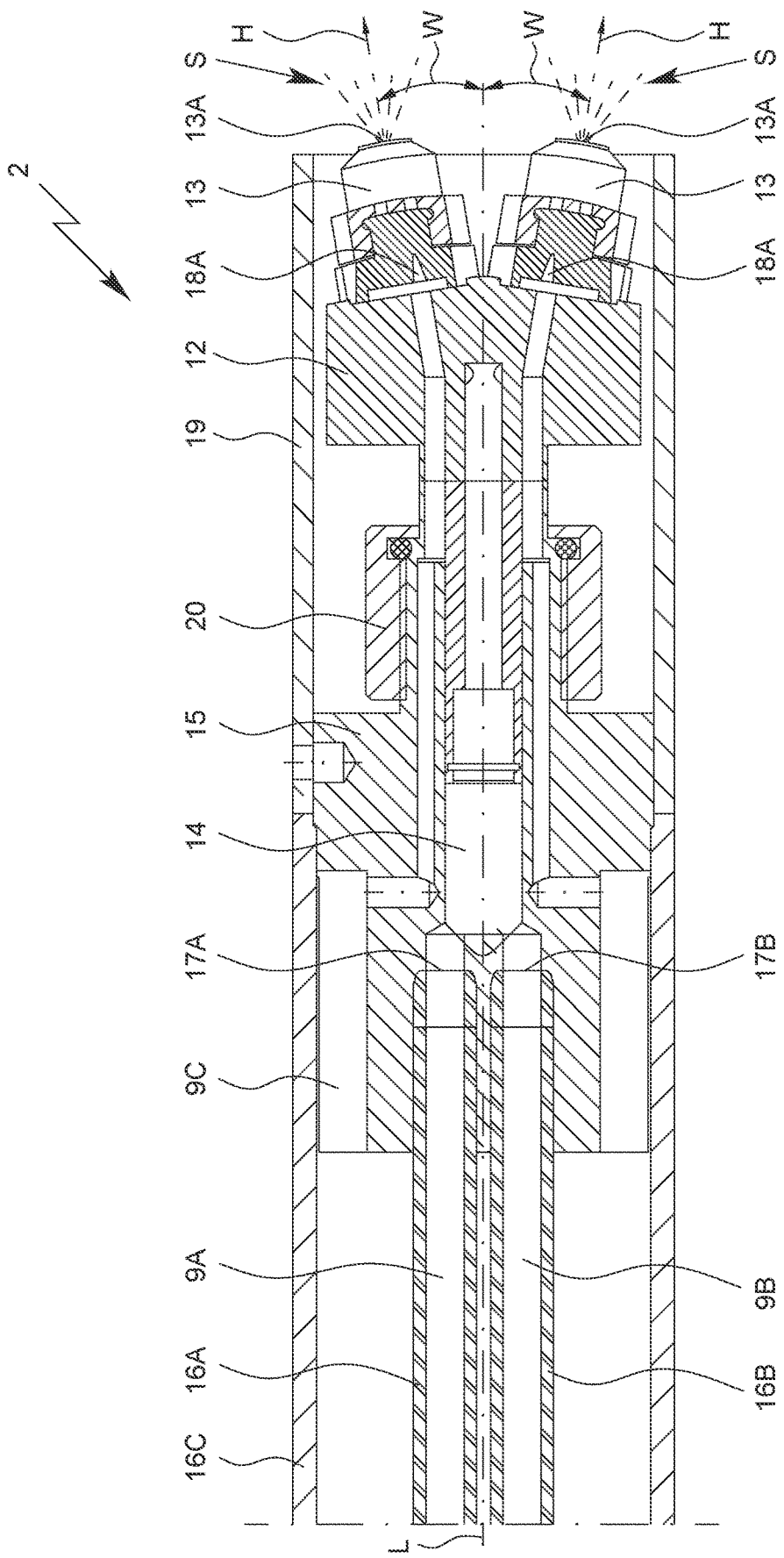
Figure 9:
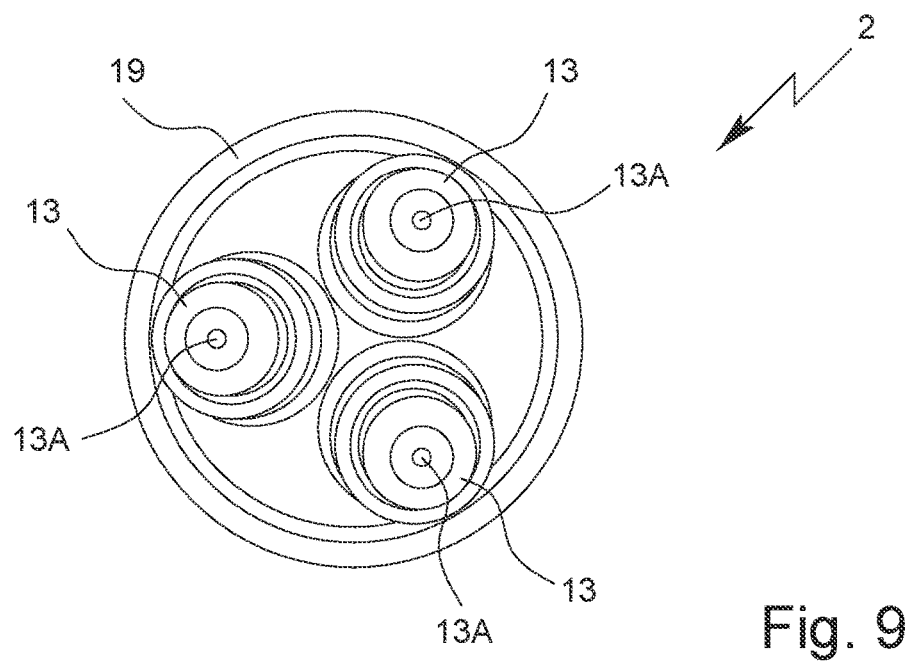
Figure 10:
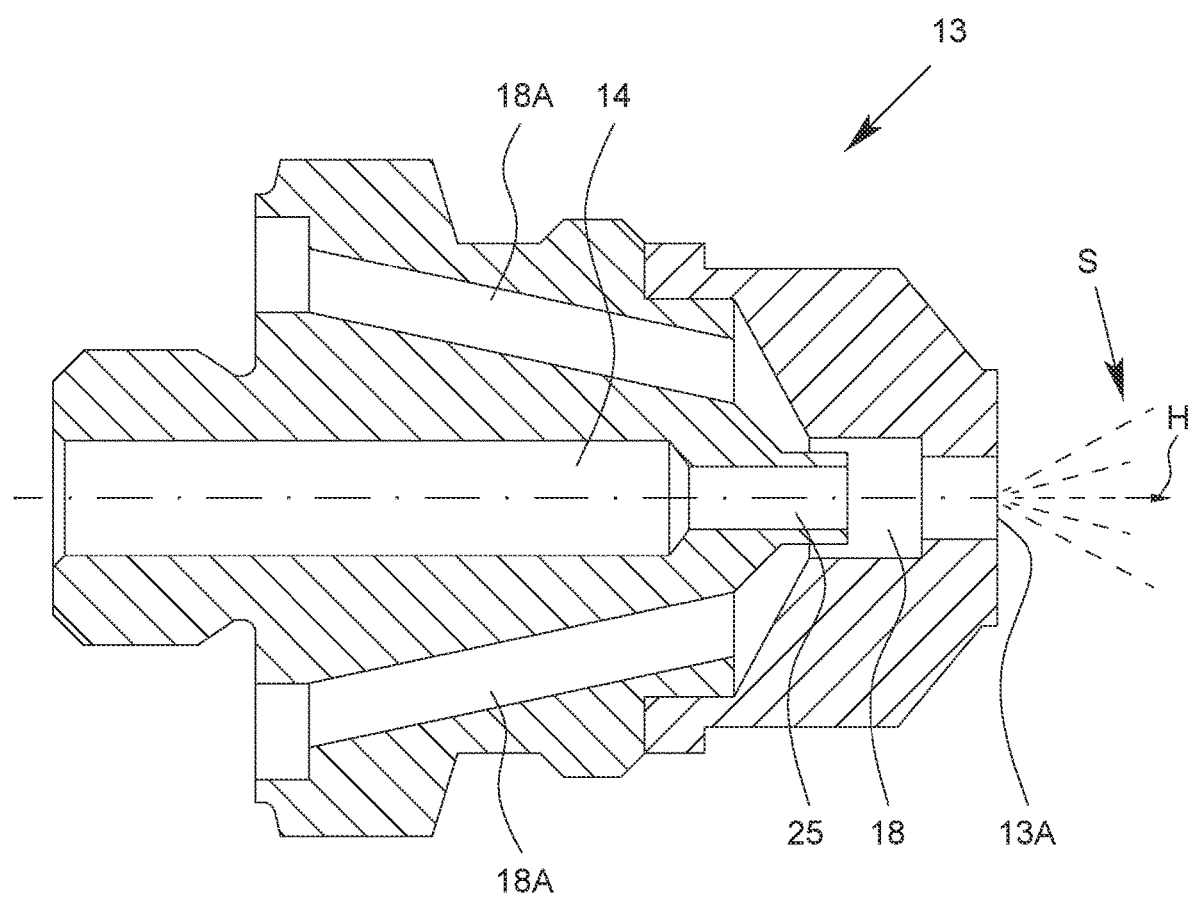
Figure 11:
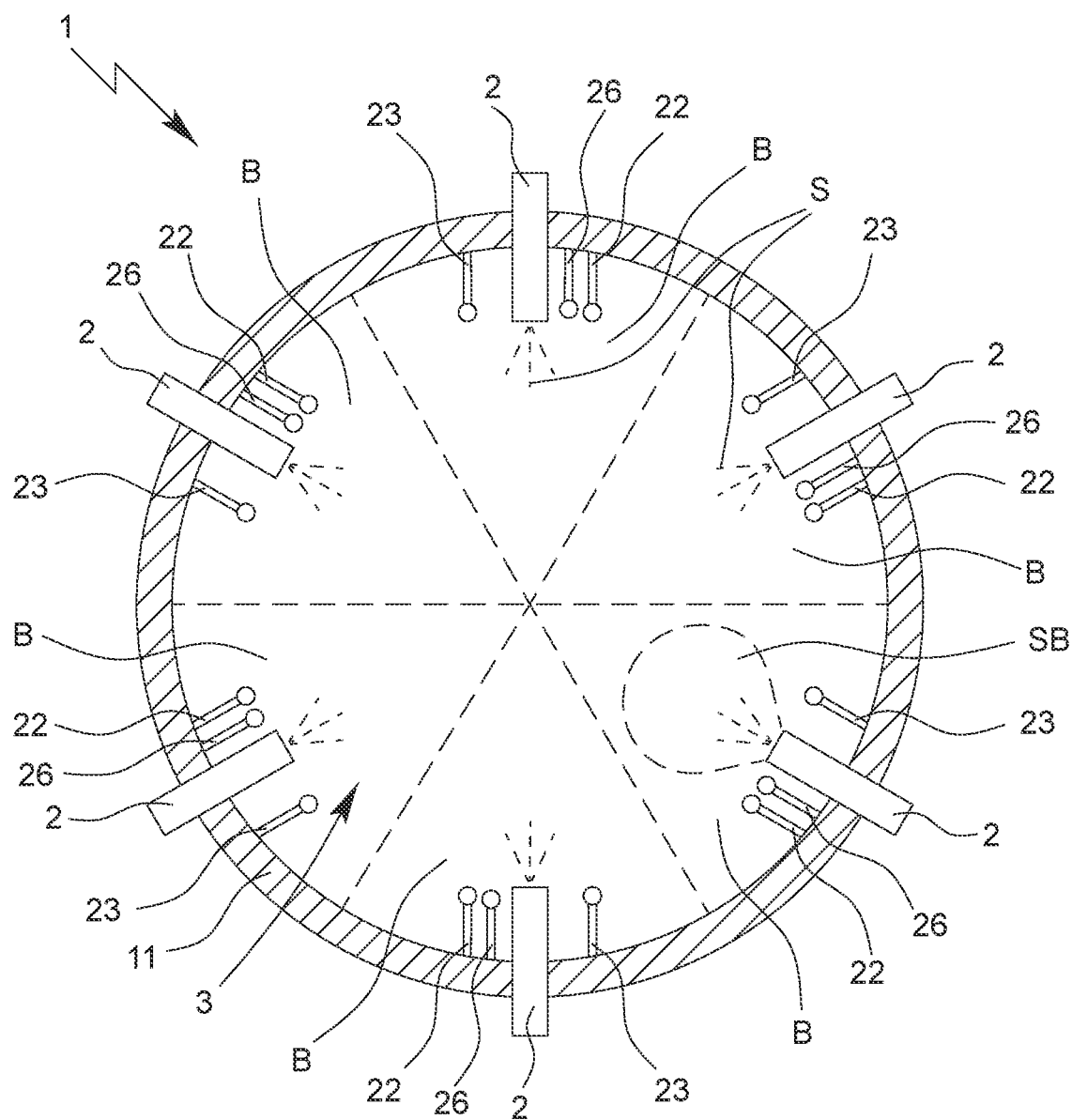
Figure 12:
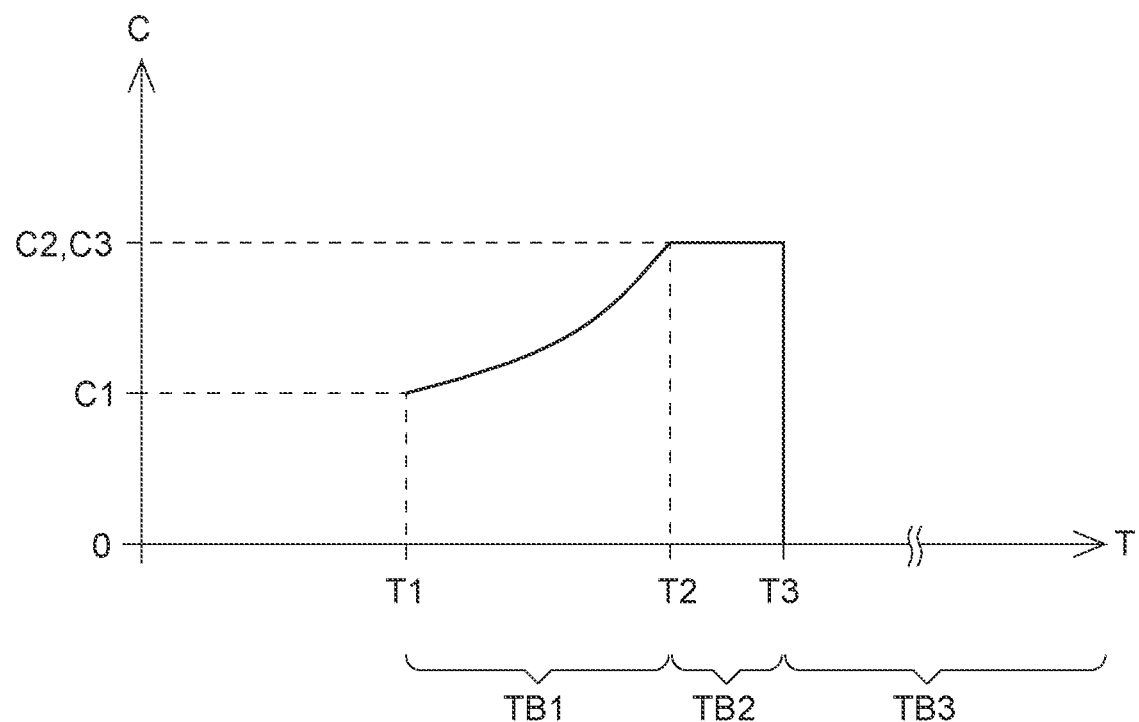

It shows:

FIG. 1 a schematic diagram of a proposed combustion plant;

FIG. 2 a schematic section through an exhaust gas chamber of the combustion plant in a plane with nozzle lances;

FIG. 3 a schematic representation of a proposed combustion plant according to another embodiment;

FIG. 4 a schematic section through the exhaust gas chamber of the combustion plant from FIG. 3;

FIG. 5 a section through an exhaust gas chamber according to another embodiment;

FIG. 6 a schematic section of a proposed nozzle lance according to a first embodiment;

FIG. 7 a schematic section of a suggested nozzle lance according to a second embodiment;

FIG. 8 a schematic section of a suggested nozzle lance according to a third and fourth embodiment;

FIG. 9 a plan view of an axial end of the nozzle lance according to the fourth embodiment;

FIG. 10 a section through a nozzle of the nozzle lance according to the third or fourth embodiment;

FIG. 11 a further schematic section through the exhaust gas chamber of a proposed combustion plant; and FIG. 12 a schematic illustration of the dependence of the concentration of an active substance on a measured temperature.

In the partly not true to scale, only schematic figures, the same reference signs are used for identical or similar parts and components, wherein corresponding or comparable characteristics and advantages can be achieved, even if a repeated description is omitted.

FIG. 1 shows a combustion plant 1 with several nozzle lances 2. The combustion plant 1 is preferably a large combustion plant. The nozzle lances 2 are assigned to a preferably common exhaust gas chamber 3 of the combustion plant 1.

The combustion plant 1 may also have several, in particular structurally separated, exhaust gas chambers 3.

Preferably, the combustion plant 1 or the exhaust chamber 3 or each exhaust chamber 3 has a chimney (not shown). The chimney preferably forms a part, section or zone of exhaust chamber 3.

Preferably the nozzle lances 2 are arranged in different, especially horizontal, planes E of the especially vertically extending or common exhaust gas chamber 3.

Preferably the nozzle lances 2 arranged in a common plane E form a nozzle lance group or each floor or plane E has a nozzle lance group.

Each plane E or nozzle lance group preferably has more than two or three and/or less than ten or eight nozzle lances 2. In principle, each plane E can have any number of nozzle lance 2, i.e. also more than ten nozzle lance 2. It is also possible that different planes E or nozzle lance groups have different numbers of nozzle lances 2.

Preferably, the combustion plant 1 has several tanks 4 or other supply facilities for an active fluid 5, an admixing fluid 6 and a pressurized gas 7. A group of tanks 4 can also be assigned to each exhaust gas compartment 3.

Preferably the active fluid 5 is a liquid, especially an ammonia solution, urea solution or other liquid.

The active fluid 5 contains an active substance such as ammonia, urea or similar, which is particularly suitable or intended for the treatment or cleaning of exhaust gas A.

Preferably the admixing fluid 6 is a liquid, especially water. The admixing fluid 6 is admixed to the active fluid 5 as required.

The preferred pressurized gas 7 is pressurized air or steam or water vapor.

Preferably, combustion plant 1 has one or more compressors to produce the pressurized gas 7 or pressurized air (also not shown in the figures).

The combustion plant 1 preferably has separate supply lines 8 to supply the nozzle lances 2 or groups of nozzle lances with the active fluid 5, the admixing fluid 6 and the pressurized gas 7, in particular to connect the tanks 4 fluidically with the nozzle lances 2.

In particular, combustion plant 1 has a supply line 8A for the active fluid 5, a supply line 8B for the admixing fluid 6 and a supply line 8C for the pressurized gas 7. Additional supply lines may also be provided.

Preferably each of the supply lines 8A, 8B, 8C is a supply line 8.

The combustion plant 1 preferably has one or more pumps (not shown in the figures), with which the active fluid 5 and/or the admixing fluid 6 can be pumped from the tanks 4 or other supply devices through the supply lines 8 to the nozzle lances 2.

Preferably, each nozzle lance 2 or nozzle lance group can be supplied with the active fluid 5, admixing fluid 6 and pressurized gas 7 via the three supply lines 8A, 8B and 8C and/or feed lines 9, in particular appropriately separated feed lines 9A, 9B and 9C.

Preferably each of the feed lines 9A, 9B, 9C is a feed line 9.

In particular, each nozzle lance 2 or nozzle lance group has separate feed lines 9A, 9B and 9C for the feed of the active fluid 5, admixing fluid 6 and pressurized gas 7. The feed lines 9 are only hinted at in FIGS. 1 and 2 and are shown more clearly in FIGS. 6 and 7, which will be explained later.

Preferably the inflows of active fluid 5, admixing fluid 6 and/or pressurized gas 7 to the individual nozzle lances 2 or nozzle lance groups are adjustable or controllable, adaptable, meterable or adjustable by means of corresponding valves 10. In the following, the term "adjustable" is used for simplification purposes, even though this may in particular include only a one-time setting or adjustment, whereby this should in particular also include (continuous) control and, if necessary, regulation.

The valves 10 are assigned to the supply lines 8, in particular to allow individual adjustability. Preferably each supply line 8 or feed line 9 has a valve 10.

In particular, an independently adjustable or controllable or adjustable valve 10 is assigned to at least each supply line 8A and 8B or feed line 9A and 9B for the active fluid 5 and admixing fluid 6 and/or each nozzle lance 2 or at least each nozzle lance group. The same preferably also applies to the third supply line 8C or feed line 9C for the pressurized gas 7, as shown schematically in FIG. 1.

FIG. 2 shows in a schematic horizontal section the exhaust gas chamber 3 in a floor or plane E with several nozzle lances 2, i.e. with one nozzle lance group. FIG. 2 also shows the preferred supply of the nozzle lance 2 or nozzle lance group via the supply lines 8 with the active fluid 5, admixing fluid 6 and pressurized gas 7.

Combustion plant 1 preferably has first valves 10A and/or second valves 10B and optional third valves 10C.

Preferably each of the valves 10A, 10B, 10C is a valve 10.

The first valves 10A are preferably each assigned to a nozzle lance 2. The first valves 10A are preferably arranged in, at or directly upstream of the respective nozzle lance 2.

In relation to an assigned nozzle lance 2, preferably a first valve 10A is arranged in the corresponding supply line 8A or feed line 9A or at their transition and a further first valve 10A in the supply line 8B or feed line 9B or their transition and optionally an additional first valve 10A (in particular in the form of a pressure regulator or reducing valve) in the supply line 8C or feed line 9C or their transition.

Preferably, the 10A valves allow the inflows of fluids 5, 6 and/or pressurized gas 7 to be adjusted or metered for individual nozzle lance 2 and/or nozzle lance groups, particularly preferably independently of other nozzle lances 2.

The valves 10A can be arranged in or directly in front of the nozzle lance 2. In particular, the valves 10A are located less than 50 cm or 100 cm away from the nozzle lance 2.

In this way an exact determination, in particular measurement and/or control, of the inflow or inflow quantities of the active fluid 5, the admixing fluid 6 and/or the pressurized gas 7 to the nozzle lance 2 is made possible.

The alternatively or additionally provided second valves 10B are preferably assigned to the different floors or planes E or nozzle lance groups or related supply rings.

With reference to an assigned plane E or nozzle lance group, preferably a second valve 10B is arranged in the corresponding supply line 8A or feed line 9A or at their transition and a further second valve 10B in the supply line 8B or feed line 9B or their transition as well as optionally an additional second valve 10B (especially in the form of a pressure regulator or reducing valve) in the supply line 8C or feed line 9C or their transition.

Preferably, the inflows of the fluids 5, 6 and/or the pressurized gas 7 can be adjusted or dosed separately or individually for each plane E or nozzle lance group by means of the valves 10B, i.e. in particular plane by plane or group by group.

The third valves 10C are optional and are preferably located upstream of risers or immediately after or near tanks 4.

The valves 10 are preferably adjustable, controllable or adjustable by electronic or other means.

The valves 10 assigned to the first and second supply lines 8A and 8B or feed lines 9A and 9B are preferably designed as ball valves or ball control valves. Additionally or alternatively, they can also be non-return valves or valves with non-return function.

The valves 10 assigned to the third supply line 8C or feed line 9C for the pressurized gas 7 are preferably designed as pressure reducers and/or pressure control valves for adjusting, controlling or regulating the pressure of the pressurized gas 7.

The other valves 10 are preferably designed to adjust, control or regulate or throttle the fluid flow, especially preferably the liquid flows or the volume flow or mass flow. Accordingly, the volume flow or mass flow of the active fluid 5 and admixing fluid 6, which is fed to the individual nozzle lances 2 or nozzle lance groups, can be individually adjusted, controlled or regulated as suggested.

By means of the valves 10, inflows and/or pressures, in particular of the active fluid 5, the admixing fluid 6 and/or the pressurized gas 7, can be optimally adapted for exhaust gas cleaning. In this way, a particularly efficient and/or active substance-saving and thus cost-effective exhaust gas cleaning can be achieved. In particular, this prevents the exhaust of active substance by adding unnecessarily high quantities of active substance.

In particular, different valves 10 of combustion plant 1 may have different designs.

Exhaust gas chamber 3 is preferably bounded by a wall 11 and/or is located on the inside of wall 11.

As shown in FIG. 2, exhaust chamber 3 or wall 11 can have a round, in particular circular or elliptical, cross-section in plane E. However, any other shape is also possible, especially a square, rectangular or other polygonal cross-section.

In FIG. 3 a combustion plant 1 is schematically shown according to a further embodiment. The flue gas chamber 3 is here limited by a wall 11 and an intermediate wall 11A. Between the intermediate wall 11A and wall 11 or an upper or roof-like section of wall 11, a passage is formed through which exhaust gas A can leave exhaust chamber 3.

Downstream of exhaust chamber 3, there is preferably an discharge channel 3A for exhaust gas A. Preferably, the discharge channel 3A is separated from exhaust chamber 3 by the intermediate wall 11A and/or fluidically connected to exhaust chamber 3 by the passage formed between wall 11 and intermediate wall 11A.

Exhaust gas chamber 3 is preferably formed essentially by wall 11 and intermediate wall 11A or surrounded or limited by them. In particular, exhaust gas chamber 3 is not a completely enclosed space. The discharge channel 3A is preferably directly connected to the exhaust chamber 3. The discharge channel 3A is preferably located downstream of exhaust chamber 3.

Preferably, the discharge channel 3A opens into a (not shown) chimney of combustion plant 1, through which exhaust gas A can leave combustion plant 1. Preferably, other devices, in particular for obtaining energy from exhaust gas A, such as one or more heat exchangers, heat accumulators, turbines or the like, are arranged along the discharge channel 3A or between the exhaust gas chamber 3 and the chimney.

FIGS. 4 and 5 show examples of a combustion plant 1 in which the exhaust gas chamber 3 has a rectangular cross-section.

FIG. 4 shows a section through the exhaust chamber 3 similar to FIG. 2, whereby only the exhaust gas chamber 3 with the nozzle lances 2 is shown here and the other elements from FIG. 2, such as the valves 10 and supply lines 8, are omitted for the sake of clarity.

In the embodiment shown in FIG. 4, the nozzle lances 2 are arranged on the long sides of the rectangular exhaust gas chamber 3. In the example shown, a plane E has six nozzle lances 2.

Such a configuration is often found, for example, in older combustion plants 1. Such combustion plants 1 can be retrofitted with nozzle lances 2 described in more detail below, so that improved exhaust gas treatment or gas cleaning is also possible in older combustion layers 1. For this purpose, it is preferable to replace the old nozzle lances 2 with new nozzle lances 2 which have been improved in accordance with the present proposal. It may be necessary to replace, renew and/or update the periphery, e.g. the supply lines 8, the valves 10 and/or a corresponding control system of the combustion plant 1 as shown in FIGS. 1 and 2.

According to another embodiment shown in FIG. 5, one or more nozzle lances 2 are to be arranged in one or more corners of the exhaust gas chamber 3 or wall 11. The nozzle lance(s) 2 preferably run(s) at an angle to the wall sections of exhaust chamber 3 adjacent to the corner.

In particular, the zone sprayed by the nozzle lances 2 can be increased or the dead space volume within the exhaust gas chamber 3 can be reduced. The term "dead space volume" is used to describe the zone or volume into which no fluid mixture delivered by the nozzle lances 2 enters. For effective exhaust gas cleaning, however, it is desirable to distribute the fluid mixture in exhaust gas chamber 3 over as wide a range as possible or to keep the dead space volume as low as possible, since exhaust gas cleaning only takes place when the fluid mixture discharged by the nozzle lances 2 comes into contact with exhaust gas A.

Preferably, wall 11 is designed to be heat-insulating, particularly preferably so that during operation of combustion plant 1 the temperature on the outside of wall 11 is significantly lower than on the inside of wall 11 or in exhaust gas chamber 3. In particular, the temperature T in exhaust gas compartment 3 can be several 100° C. to over 1000° C. and/or the temperature on the outside of wall 11 or outside exhaust gas compartment 3 is preferably less than 50° C. or 30° C.

Nozzle lances 2 can also be provided with thermal insulation, especially so that the temperature in nozzle lance 2 is less than 50° C. or 30° C.

Preferably the nozzle lances 2 are at least essentially arranged in or within wall 11 and/or the nozzle lances 2 protrude into the exhaust gas chamber 3.

Preferably the nozzle lances 2 run diagonally or crosswise, especially preferably at least essentially at right angles to wall 11. However, deviating from the illustration in the figures, it can also be especially preferred to arrange the nozzle lances 2 not at a right angle but "tangentially" or at an acute angle to wall 11 or parallel to wall 11.

Alternatively or additionally the nozzle lances 2 can be aligned horizontally or inclined to the horizontal, especially so that the nozzles 13 of the nozzle lances 2 point diagonally upwards or downwards.

In particular, the nozzle lance 2 is elongated and/or tubular. The nozzle lance 2 preferably has an axis of symmetry or longitudinal axis L.

The nozzle lance 2 preferably has a nozzle head 12. The nozzle head 12 is preferably located at an axial end of the nozzle lance 2 or at an end projecting into the exhaust gas chamber 3.

The nozzle head 12 is preferably arranged straight at the nozzle lance 2, but can also be arranged diagonally or transversely, especially at right angles to the nozzle lance 2.

Nozzle head 12 has at least one nozzle 13 or nozzle opening 13A (shown in FIGS. 6 and 7), in order to generate or emit an aerosol or spray S from the active fluid 5 with optionally admixed admixing fluid 6, as shown schematically.

Preferably, the main discharge direction H of the nozzle 13 runs straight or along the longitudinal axis L or at an angle to it. The main discharge direction H of nozzle 13 is preferably a central axis of the zone sprayed by nozzle 13 or of the spray S.

In particular, the nozzle lance 2 or the nozzle head 12 may protrude from the wall 11 and/or project into the exhaust chamber 3.

The length of the nozzle lance 2 is preferably more than 30 cm or 40 cm, particularly preferably 60 cm or more, and/or less than 140 cm or 120 cm, particularly preferably less than 100 cm or 80 cm.

The length of the section of the nozzle lance 2 and/or the nozzle head 12 projecting into the exhaust chamber 3 or out of the wall 11 along the longitudinal axis L is preferably more than 10 cm or 20 cm and/or less than 40 cm or 30 cm. However, it is also possible that the nozzle lance 2 and/or nozzle head 12 protrudes from wall 11 only less than 10 cm or not at all or that the length of the section protruding from wall 11 is less than 10 cm or 0 cm.

The nozzle lances 2—especially of a group or plane E—can be arranged on different, especially opposite, sides of the exhaust chamber 3. In particular, this allows the (cross-sectional) zone sprayed by the nozzle lances 2 to be as large as possible and/or sprayed as homogeneously as possible.

FIG. 6 shows a section of the proposed nozzle lance 2 along the longitudinal axis L according to a first embodiment.

The nozzle lance 2 is preferably designed for the atomization of the active fluid 5 and optionally admixing fluid 6 by means of pressurized gas 7. In FIG. 6 the fluids 5, 6 and the pressurized gas 7 are not shown, but the generated aerosol or spray S is indicated.

In particular, the nozzle lance 2 is used for exhaust gas treatment, particularly preferably exhaust gas cleaning and/or flue gas denitrification or flue gas desulfurization, especially in combustion plants 1.

The nozzle lance 2 preferably has the three feed lines 9, in particular the feed line 9A for the active fluid 5, the feed line 9B for the admixing fluid 6 and the feed line 9C for the pressurized gas 7.

Preferably the feed lines 9 run along and/or parallel to the longitudinal axis L in the nozzle lance 2.

The feed lines 9, in particular the feed lines 9A, 9B, may be arranged next to each other, in particular parallel and/or at a distance from the longitudinal axis L and/or coaxial to each other.

The nozzle lance 2 is preferably designed so that the admixing fluid 6 can be admixed to the active fluid 5 in the nozzle lance 2.

The feed line 9A and/or the feed line 9B preferably run within the pressurized gas feed line 9C, in particular so that the feed lines 9A, 9B are inner feed lines 9 and/or the pressurized gas feed line 9C is an outer feed line 9. The pressurized gas feed line 9C therefore preferably surrounds the other feed lines 9.

It is also possible for the nozzle lance 2 to have an outer pipe or tube surrounding or forming the feed lines 9, in particular the pressurized gas feed line 9C. In particular, the outer pipe may be designed to protect the nozzle lance 2 or parts of the nozzle lance 2 located within the outer pipe from damage, e.g. due to mechanical effects, the effects of heat and/or the ingress of fluid.

The outer pipe can also be designed as a guide for the nozzle lance 2.

Preferably, the nozzle lance 2 has a mixing zone 14. Preferably, the mixing zone 14 is located centrally in the mixing part 15 and/or to the longitudinal axis L.

The mixing zone 14 is preferably formed by a space or zone that is formed or arranged completely within the nozzle lance 2.

Preferably, the first feed line 9A and the second feed line 9B end in the mixing zone 14 or the first feed line 9A and the second feed line 9B end in the mixing zone 14. Preferably, the mixing zone 14 is located or formed downstream or at an outlet end of the feed line(s) 9A and/or 9B.

Preferably, the mixing zone 14 has a larger (flow) cross-section than the first feed line 9A and/or the second feed line 9B.

Preferably, the first feed line 9A and the second feed line 9B are fluidically connected to each other in or through the mixing zone 14. Preferably, the third feed line 9C is not directly connected to the mixing zone 14.

Preferably, the mixing zone 14 is used for the optional mixing of the admixing fluid 6 to the active fluid 5. In particular, a (liquid) fluid mixture of the active fluid 5 and admixing fluid 6 can be generated or produced in the mixing zone 14.

Preferably, the fluid mixture should therefore have the active fluid 5 and/or the admixing fluid 6.

Preferably, the mixing zone 14 is located or formed upstream of the nozzle head 12 and/or the nozzle 13 and/or an atomization zone 18, in particular shortly or immediately in front of it.

Preferably, the mixing zone 14 is located at a distance from the lance end or nozzle 13 or nozzle opening 13A and/or completely inside the nozzle lance 2.

Preferably, the distance between the mixing zone 14 and the nozzle 13 and/or nozzle opening 13A of the nozzle lance 2 should not exceed a few centimeters. However, the distance between the mixing zone 14 and the nozzle 13 and/or nozzle opening 13A of the nozzle lance 2 should preferably be as small as possible, for example about 1 cm.

In the mixing zone 14, the active fluid 5 and the admixing fluid 6 are preferably mixed together by swirling and/or combining to form a stream, whereby a static mixer can be used or formed as an option. Alternatively, the admixing fluid 6 is preferably mixed radially with the active fluid 5 or vice versa. Preferably, there is no atomization or spraying of the (liquid) fluid mixture of the active fluid 5 and the admixing fluid 6 in the mixing zone 14.

Especially preferred is to adjust or change the concentration of the active substance in the fluid mixture, especially to reduce it.

However, it is also possible that no admixing fluid 6 is admixed to the active fluid 5 when operating the nozzle lance 2. This can be advantageous, for example, if the inflow of the active substance to exhaust chamber 3 required for exhaust gas treatment can or should be realized by solely dispensing or spraying or atomizing the active fluid 5 into exhaust chamber 3. This is the case if the maximum possible concentration of the active substance for exhaust gas treatment, namely the concentration of the active substance in the active fluid 5, is used.

Alternatively or additionally, it is possible to operate the nozzle lance 2 only with admixing fluid 6 without spraying or atomizing active fluid 5 or the active substance into the exhaust chamber 3. In particular, this allows moisture enrichment and/or cooling of exhaust gas A or flue gas/combustion gas for so-called "flue gas conditioning".

Alternatively, it is also possible that the admixing fluid 6 contains a different active substance and that, depending on the ratio of the mixture of fluids 5 and 6, the ratio of the two active substances is influenced accordingly.

By means of the mixing zone 14 or the optional mixing of the admixing fluid 6 in or directly in front of the nozzle lance 2, the desired quantities of active fluid 5 and admixing fluid 6 can be atomized as precisely as possible under the optional pressure conditions of pressurized gas 7. In addition, each nozzle lance 2 can be adjusted or controlled separately in this way.

Preferably, fluids 5 and 6 are first mixed together in the mixing zone 14 and only then, i.e. a little downstream, the pressurized gas 7 is added.

Preferably the (complete) mixing of the fluid mixture is also/first done during atomization.

Preferably, the mixing zone 14 adjoins the nozzle head 12 and/or extends the mixing zone 14, at least partially, into the nozzle head 12.

The nozzle lance 2 preferably has a mixing part 15. Preferably, the mixing part 15 forms or has a mixing zone 14.

Preferably, the mixing part 15 also partially forms or features the feed lines 9A and 9B.

Preferably, the nozzle lance 2 has two tubes 16A and 16B, which form the feed lines 9A and 9B. Preferably, the tubes 16A, 16B are connected to the mixing part 15 on the outlet side.

On the inlet side, tubes 16A and 16B are connected or connectable to supply lines 8A and 8B or first valves 10A.

Preferably, the tubes 16A, 16B are inserted or welded into the mixing part 15, especially so that tight fluidic connections are made in each case.

Preferably, the feed lines 9A and 9B or the tubes 16A and 16B with openings 17A, 17B open into the mixing zone 14 or into the mixing part 15. Optional channels 15A of the mixing part 15 can then conduct the fluids 5 and 6 into the mixing zone 14.

The mixing part 15 is preferably formed by a component inserted or insertable into the nozzle lance 2, which can be optionally dismantled or replaced, for example to adjust flow resistance or mixing properties.

The mixing part 15 can be inserted into the nozzle head 12, be screwed to the nozzle head 12 and/or form a structural unit with the nozzle head 12 and/or have or form the nozzle head 12. Preferably, the mixing part 15 is connected to the nozzle head 12 in a pressure-tight or fluid-tight manner.

Preferably, the nozzle lance 2 or the nozzle head 12 has an atomization zone 18. Preferably, the atomization zone 18 is fluidically connected—in particular directly or via an intermediate or swirling zone 25—to the mixing zone 14 and/or to the pressurized gas feed line 9C.

In the illustration example, the atomization zone 18 is preferably arranged or formed in the nozzle body or head 12 and/or between the mixing zone 14/mixing part 15 and the nozzle opening 13A.

Alternatively, the atomization zone 18 can also be arranged or formed in the mixing part 15 or another or separate component, such as a connecting section 20 (second embodiment according to FIG. 7).

The supply or injection of pressurized gas 7 into the atomization zone 18 is preferably carried out via one or more holes or supplies 18A, as indicated in FIG. 6. Preferably, the pressurized gas supply line 8C is fluidically connected to the atomization zone 18 by means of the feed lines 18. In particular, the feed lines 18A run at an angle to the longitudinal axis L and/or from the outside to the inside or radially.

The 18A feeders are preferably arranged downstream of the mixing zone 14.

The atomization zone 18 is preferably located downstream of the mixing zone 14 and/or upstream of the nozzle 13 or nozzle opening 13A.

Preferably, the mixing zone 14 and the third supply line or pressurized gas feed line 9C are fluidically connected to each other in or via the atomization zone 18.

Furthermore, preferably the atomization zone 18 is only indirectly connected to the feed lines 9A, 9B or connected to them, especially through or via the mixing zone 14.

Preferably, the pressurized gas 7 is fed to or mixed with the active fluid 5 or the fluid mixture in the atomization zone 18, in particular through the feeds 18A.

The atomization zone 18, the nozzle 13 and/or the nozzle head 12 are preferably arranged or formed downstream and/or on the outlet side of the mixing zone 14, mixing part 15 and/or intermediate or swirl zone 25.

The nozzle head 12 has or forms a nozzle 13 or several nozzles 13.

The nozzle head 12, the atomization zone 18 and/or the nozzle 13 are thus designed for atomizing the active fluid 5 or fluid mixture, in particular together with or through the pressurized gas 7.

Preferably, the nozzle lance 2 is designed in such a way that first of all a pure mixing of the liquid active fluid 5 and the liquid admixing fluid 6 takes place in the mixing zone 14 and only then or downstream the pressurized gas 7 (in the atomization zone 18) is fed to the fluid mixture of active fluid 5 and admixing fluid 6 and a liquid/gas mixture is formed, i.e. only then in the atomization zone 18 and/or later (if necessary only or additionally in the nozzle 13) an atomization takes place.

Preferably, atomization is carried out in exhaust chamber 3, particularly preferably at least essentially horizontally.

The nozzle 13 is preferably designed to produce a cone-like spray S, in particular at least approximately in the form of a full cone or hollow cone, so that areas above and/or below the spraying nozzle lance 2 are also sprayed. However, it is also possible that the nozzle 13 is designed to produce the spray S as a flat spray, so that the spray S is sprayed at least substantially in a preferably horizontal plane E.

Preferably, the atomization zone 18 is arranged centrally or centrally in the nozzle lance 2, in particular so that the atomization zone 18 has or surrounds the longitudinal axis L.

Preferably, the atomization zone 18 has the nozzle 13.

Preferably, the cross section of the atomization zone 18 or the nozzle 13 first increases in the direction of the outlet or exhaust chamber 3 and then decreases again or vice versa. The atomization zone 18 or the nozzle 13 preferably has two adjoining areas, whereby the cross-section increases in one zone and decreases in the other. In particular, nozzle 13 can be used as a Laval nozzle or is nozzle 13 designed as a Laval nozzle.

The nozzle lance 2 has on the outlet side preferably a single or exactly one nozzle 13 or orifice 13A or an outlet, especially where the orifice or outlet is formed by the nozzle 13 or nozzle orifice 13A. Here, however, other solutions are also possible, which will be discussed in more detail below.

The feed lines 9A, 9B, 9C preferably do not form an outlet of the nozzle lance 2 or have an outlet through which a fluid conducted through the feed lines 9A, 9B, 9C can leave the nozzle lance 2 directly or directly or unmixed.

Preferably, the nozzle lance 2 or the nozzle head 12 has a holding piece 19. Preferably, the holding piece 19 surrounds the nozzle head 12 at least essentially completely in circumferential direction.

In particular, the nozzle head 12 is inserted fluid-tight into the holding piece 19 or screwed or welded to it.

Preferably, the nozzle lance 2 has a (third) pipe 16C, which forms the feed line 9C and/or a sheath or outer pipe of the nozzle lance 2.

Preferably, the holding piece 19 is attached to the tube 16C on the outlet side, in particular screwed or welded to it.

On the inlet side, the tube 16C is connected or connectable to the supply line 8C or a first valve 10A.

Preferably each of the tubes 16A, 16B, 16C is a tube 16 of the nozzle lance 2.

The valves 10A assigned to the feed lines 9 and/or tubes 16 are preferably designed as control or regulating valves. Furthermore, it is also possible that the valves 10A prevent a fluid 5, 6 from flowing back in feed line 9 or tube 16.

Furthermore, the feed lines 9, the mixing zone 14, the channels 15A and/or the tubes 16 can be designed by their shape, dimensions and/or volumes to prevent backflow.

In the following, special reference is made to FIG. 7, which shows a second embodiment of the nozzle lance 2. Differences to the first embodiment are explained, especially with regard to the mixing part 15 and the mixing zone 14. We will not repeat the description of identical or similar features, so that the previous explanations also apply to the second embodiment in addition or accordingly.

In contrast to the first embodiment, the second embodiment has the feed lines 9 running coaxially, especially to the longitudinal axis L, so that a first feed line 9 surrounds a second feed line 9 and/or two feed lines 9 are arranged one inside the other. In particular, the feed line 9A is the first feed line 9 and the feed line 9B is the second feed line 9.

When the nozzle lance 2 is operated, the active fluid 5 is especially directed through the feed line 9A located on the very inside and/or the admixing fluid 6 is directed through the feed line 9B, which surrounds the feed line 9A.

The feed lines 9, 9A, 9B are preferably fluidically connected to each other by mixing openings 17C in the wall of the inner feed line 9, 9A.

The (inner) feed line 9, 9A may have mixing openings 17C on several sides and/or on each side.

Preferably, the mixing openings 17C are arranged only on an axial end section of the feed line 9, 9A, facing in particular the mixing zone 14, mixing part 15 and/or nozzle head 12. In particular, the mixing zone 14 has the mixing openings 17C.

The above explanations regarding the arrangement of feed lines 9, 9A, 9B preferably also apply to tubes 16, 16A, 16B.

In the second embodiment, the nozzle lance 2 can have a connecting piece 20, which is located in particular between the mixing part 15 and the nozzle head 12 or connects them together.

Optionally, the connecting piece 20 can (also) form the mixing zone 14.

The connecting piece 20 can be inserted and/or welded into and/or to the mixing part 15 and/or the nozzle head 12, especially so that a tight fluidic connection is created.

It is also possible that the connecting piece 20 is designed in one piece with the mixing part 15 and/or the nozzle head 12.

Preferably, the nozzle lance 2 of the second embodiment does not have a holding piece 19. In particular, the nozzle head 12 takes over the function of holding piece 19 and/or the nozzle head 12 has holding piece 19.

In the second embodiment, pipe 16 is preferably connected to nozzle head 12 on the outlet side. Preferably, pipe 16C is inserted into nozzle head 12 or screwed or welded to it, especially so that a tight fluidic connection is created.

In general, especially in both the first and second embodiments, the optional intermediate or swirl zone 25 can be arranged or formed between the mixing zone 14 and the atomization zone 18, for example by an annular groove, shoulder, enlargement of the flow cross-section, a mixing element and/or the like, in order to effect or (further) support the mixing of active fluid 5 and admixing fluid 6, particularly preferably by generating turbulence, eddies or the like. In this way it can be achieved that the liquid fluid mixture of the two fluids 5 and 6 is mixed in the desired manner or sufficiently before the pressurized gas 7 is fed in or an atomization and/or formation of a gas-liquid mixture takes place.

FIGS. 8 and 9 schematically show a third and fourth embodiment of the nozzle lance 2. The third and fourth embodiment differ from the first and second embodiment described above in particular in that the nozzle lance 2 or nozzle head 12 has several nozzles 13 and/or nozzle openings 13A, in particular exactly two nozzles 13 (third embodiment) or exactly three nozzles 13 (fourth embodiment). In the following, only the differences between the third and fourth embodiment and the first and second embodiment are described. Unless otherwise described in the following, or unless it is obvious from the context, the nozzle lance 2 in accordance with the third and fourth embodiment also has the characteristics of the first and/or second embodiment described above.

FIG. 8 shows a schematic section of the nozzle lance 2 in accordance with the third or fourth embodiment. In the third embodiment, the nozzle lance 2 or the nozzle head 12 preferably has exactly two nozzles 13. In the fourth embodiment, the nozzle lance 2 or nozzle head 12 preferably has exactly three nozzles 13.

The two or three nozzles 13 are preferably identically designed.

Preferably, the nozzles 13 are arranged symmetrically to the longitudinal axis L.

Preferably, in one or more, especially each, of the nozzles 13, the main discharge direction H of the respective nozzle 13 is in one plane with the longitudinal axis L of the nozzle lance 2.

The nozzles 13 are preferably directly adjacent to each other. Preferably, the nozzles 13 are all arranged at the same axial end of the nozzle lance 2 or are not distributed over the length of the nozzle lance 2.

The nozzles 13 are preferably arranged diagonally or at an acute angle W to the longitudinal axis L of the nozzle lance 2. In other words, the main discharge direction H of the nozzles 13 preferably runs diagonally or at an acute angle W to the longitudinal axis L.

The angle W is preferably at least 8°, particularly preferably at least 11°, and/or at most 20°, particularly preferably at most 15°.

In the third embodiment, the angle W for both nozzles 13 is preferably about 11°.

In the fourth embodiment, the main discharge directions H of a first and second of the three nozzles 13 are preferably in a common plane. Preferably, the main discharge direction H of a third of the three nozzles 13 is inclined to this plane.

It is preferred for the fourth embodiment that the angle W for the first and second nozzle 13 is about 15° each and the angle W for the third nozzle 13 is about 11°.

Preferably, the third nozzle 13 is arranged centrally or symmetrically between the first and second nozzle 13. In particular, the term "centrally" refers to the fact that the third nozzle 13 is at the same distance from the first and second nozzle 13. This does not imply that the third nozzle 13 is also positioned centrally on a connecting line between the first and second nozzle 13 or that it is positioned in line with the first and second nozzle 13. The third nozzle 13 is preferably spaced from a connecting line between the first and second nozzle 13.

In the combustion plant 1, the main discharge directions H of two nozzles 13 are preferably perpendicular to a main flow direction A of exhaust gas A and/or the main discharge direction H of the third nozzle 13 is at an angle to the main flow direction A of exhaust gas A. The main flow direction A of exhaust gas A is indicated by arrows in FIGS. 1 and 3.

The main flow direction A of exhaust gas A in exhaust chamber 3 is preferably vertical or along the direction of gravity from bottom to top, as shown in the figures. Preferably, the main discharge direction H of two nozzles 13 is horizontal and/or the main discharge direction H of one or the third nozzle 13 points diagonally downwards in relation to the vertical.

By arranging the nozzles 13 in relation to each other in the way explained, the zone sprayed by the nozzles or the spray cone or spray zone SB of the nozzle lance 2 in particular can be enlarged. By enlarging the spray zone SB of the nozzle lances 2, the dead space volume in exhaust gas chamber 3, i.e. the zone in exhaust gas chamber 3 which is not sprayed by the nozzle lances 2, can be increased, thus improving exhaust gas treatment or exhaust gas cleaning.

FIG. 10 schematically shows a nozzle 13 of the nozzle lance 2 according to the third and fourth embodiment.

Preferably, the nozzles 13 each have the feeds 18A for feeding the pressurized gas 7 to the active fluid 5. The nozzle lance 2 and nozzles 13 are preferably designed so that the fluid mixture of active fluid 5 and admixing fluid 6 and the pressurized gas 7 are fed to the nozzles 13 via separate supply lines and/or are only brought together or mixed with each other within the nozzles 13.

The nozzle lance 2 is preferably designed to spray the same fluid or fluid mixture through all nozzles 13.

The nozzles 13 preferably form outlets of a common atomization zone 18 or are fluidically connected to a common atomization zone 18, in particular so that the same fluid mixture emerges or is atomized through the nozzles 13 when the nozzle lance 2 is operated.

Preferably, the combustion plant 1 has a control system 24, in particular wherein the control system 24 is designed to control the exhaust gas treatment. The control is achieved in particular by controlling the inflows, especially of the fluids 5 and 6, to the nozzle lances 2 and/or the pressure of the pressurized gas 7.

Preferably, the control system 24 has measuring devices 21, which are especially designed to measure pressures. Preferably, the measuring devices 21 are used to measure the pressure of the pressurized gas 7.

In particular, the measuring devices 21 assigned to the pressurized gas feed line 9C can be manometers for pressure measurement, which can also be used as pressure regulators. The pressure of the pressurized gas 7 can be measured and adjusted with the pressure gauges in particular.

Furthermore, the measuring devices 21 can also be designed or serve for the measurement of inflows or inflow quantities, in particular of fluids 5, 6.

To simplify the illustration, however, only measuring devices 21 are shown in FIGS. 1 and 2, which are assigned to supply line 8C or feed line 9C for pressurized gas 7.

It is also possible that the measuring devices 21 have the valves 10 or that the measuring devices 21 are multifunctional measurement-dosing devices for simultaneous measurement and dosing.

Preferably, the control system 24 has different or differently designed measuring devices 21.

Furthermore, the control system 24 preferably has one or more measuring devices 22 for measuring or determining a quantity or concentration of pollutants, in particular nitrogen oxides NOx and/or sulphur oxides SOx, in exhaust gas A.

Preferably the measuring device 22 is a lambda sensor or the measuring device 22 has a lambda sensor.

One or more measuring devices 22 may be provided, which are preferably located in the chimney of combustion plant 1. The measuring devices 22 can be arranged at different heights in the chimney or exhaust gas chamber 3 and/or on different sides of the chimney or exhaust gas chamber 3. In particular, it is possible that one or more measuring devices 22 are arranged on the roof or at an upper end of the exhaust chamber 3, i.e. preferably above the nozzle lances 2. For simplification, however, only one measuring device 22 is shown in FIG. 2. Optionally, each plane E with nozzle lances 2 can also have one or more measuring devices 22, which is located in particular on wall 11 or near wall 11.

Furthermore, the control system 24 preferably has one or more thermometers 23 for measuring temperatures T, especially in the exhaust gas chamber 3.

Preferably, the thermometers 23 are located in exhaust gas chamber 3, preferably at the level of the planes E.

Several thermometers 23 may be provided, which are arranged in particular at different heights in exhaust chamber 3 and/or on different sides of exhaust chamber 3. For simplification, however, only one thermometer 23 is shown in FIG. 2.

The term "thermometer" should preferably be understood broadly in the context of the present invention. In particular, a thermometer is basically understood to be any device or plant which is designed or suitable for measuring, recording or determining a temperature T in the exhaust gas chamber 3 during operation of the combustion plant 1. In particular, it is also possible that the temperature T is only measured indirectly or indirectly, i.e. that it is determined in particular from other measured values, in particular by means of a formula and/or an algorithm, for example from the measurement of an (electromagnetic) wavelength or a speed of sound or the like.

Preferably, the thermometer 23 or the thermometers 23 are formed by a plant for acoustic gas temperature measurement and/or sonic pyrometry or by one or more pyrometers or radiation thermometers.

The combustion plant 1 or the control system 24 may also have one or more measuring devices 26 for measuring a volume flow and/or a flow velocity of the exhaust gas A in exhaust gas chamber 3. This enables a more efficient exhaust gas cleaning or a more precise adjustment of the fluid mixture discharged by the nozzle lances 2.

Preferably each nozzle lance 2, each supply line 8, each feed line 9 and/or each plane E is assigned a measuring device 21, a measuring device 22, a measuring device 26, a valve 10 and/or a thermometer 23. In particular, it is also possible that the nozzle lances 2 each have one or more measuring devices 21, 22, 26, valves 10 and/or thermometer 23.

According to one embodiment, one or more measuring devices 22, 26 and/or thermometer 23 are arranged on a roof or at an upper end of the exhaust gas chamber 3, i.e. preferably above the nozzle lance 2.

It is possible that the exhaust gas chamber 3 has one or more measuring modules, whereby the measuring module preferably has at least one measuring device 22, at least one measuring device 26 and/or at least one thermometer 23.

Preferably, the measuring devices 21, 22, 26 and/or thermometer 23 are designed to transmit the signals and/or measured values measured by them to the control system 24.

Preferably, the control system 24 receives signals or measured values measured by the measuring devices 21, 22, 26 and/or the thermometers 23 and/or the control system 24 processes these signals or measured values and/or is the control system 24 designed for this purpose.

Preferably, the control system 24 controls the valves 10, in particular on the basis of these signals or measured values, especially where the inflows to the nozzle lances 2 and/or pressures of the pressurized gas 7 are controlled or adjusted. In particular the valves 10 can thus be opened and/or closed with the control system 24.

The control system 24 is preferably designed to control the exhaust gas treatment or mixing of the fluid and/or delivery or admixing of the active substance or active fluid 5 as a function of the temperature T measured by the thermometer 23 or thermometers 23 and/or the values or signals measured by the measuring devices 21, 22, 26 in the exhaust gas chamber 3. The combustion plant 1 or the control system 24 is preferably designed to adjust or control the quantity and/or concentration of the active fluid 5 and/or the active substance, in particular the atomized fluid, on the basis of or as a function of the temperature T measured by the thermometer 23 or the thermometers 23 and/or the values or signals measured by the measuring devices 21, 22, 26.

Preferably the exhaust chamber 3 has different zones B or is the exhaust chamber 3 divided into different zones B or are assigned to the exhaust chamber 3 different zones B. This is shown as an example in the schematic section according to FIG. 11, which shows a modified embodiment of the combustion plant 1 or exhaust gas chamber 3.

In the example shown in FIG. 11, the zones B are sectors of an especially cylindrical exhaust chamber 3. However, the zones B can basically have or form any two-dimensional or three-dimensional shape.

Preferably, each zone B is a plane E or a sector of a plane E. Preferably, the zones B are at least essentially two-dimensional or flat or layered and/or extend flat in radial direction to the vertical and/or main flow direction A of the exhaust gas A to be treated.

Preferably, each zone B is assigned a nozzle lance 2, a thermometer 23, a measuring device 22 for measuring a quantity or concentration of pollutants, especially in the exhaust gas A, and/or a measuring device 26 for measuring the flow velocity or volume flow of the exhaust gas A. In particular, each zone B may have a nozzle lance 2, a thermometer 23 and/or a measuring device 22.

The combustion plant 1 is preferably designed to measure the temperature T in different zones of the exhaust gas chamber 3, in particular by means of the thermometers 23 and/or the control system 24. Preferably, the measurement of the temperature T in different zone B can be carried out independently of each other.

Preferably, the combustion plant 1 is designed to adjust a quantity or concentration C of the active substance in the fluid or fluid mixture that is atomized or discharged into the exhaust gas chamber 3 very quickly, i.e. with a short dead time, preferably in less than 5 s, preferably in less than 1 s, especially in less than 0.1 s, especially preferably in less than 0.01 s, after the measurement of the temperature T and/or pollutant concentration. This is made possible in particular by the proposed nozzle lance 2. This will be discussed in more detail later.

In a method for exhaust gas treatment in the combustion plant 1, preferably a temperature T and/or pollutant concentration is measured in the exhaust gas chamber 3 and in particular the amount or concentration C of the active substance in the atomized fluid or fluid mixture is adjusted or controlled as a function of the measured temperature T and/or pollutant concentration.

The quantity or concentration C of the active substance in the atomized fluid or fluid mixture is referred to in the following as quantity or concentration C of the active substance. These terms therefore refer to the atomized or injected fluid or fluid mixture, unless otherwise stated.

The quantity or concentration C of the active substance is preferably adjusted, controlled or determined by the mixing ratio between the active fluid 5 and the admixing fluid 6. As described above, the active fluid 5 contains the active substance, e.g. ammonia, urea and/or a calcium-containing compound.

Preferably, the concentration C of the active substance in the active fluid 5 is constant or not variable, especially since the active fluid 5 with the active substance is stored in a tank 4, as explained above.

The term "quantity" is preferably used to describe the absolute quantity of the active substance discharged or injected (into exhaust chamber 3) per unit of time, for example in l/min or kg/min, or an equivalent quantity.

The volume flow of the discharged fluid—depending on the mixture the active fluid 5, the admixing fluid 6 or a mixture thereof—and the volume flow or pressure of the pressurized gas 7 are preferably matched to the combustion plant 1 or the exhaust gas chamber 3 and the respective nozzle lance 2 or nozzle 3 or groups thereof and are preferably not changed during operation of the combustion plant 1 or during the method for exhaust gas treatment Preferably, the concentration C or quantity of the active substance or the mixing ratio of active fluid 5 to admixing fluid 6 is the only parameter which is or can be changed during the method or during the exhaust gas treatment or injection—in particular individually for individual nozzles 13 or nozzle lances 2 or groups of nozzles 13 or nozzle lances 2.

FIG. 12 shows an example of a possible (intended) functional relationship between the concentration C of the active substance in the injected or discharged fluid and the temperature T in the exhaust chamber 3 or the corresponding zone B of the exhaust chamber 3 or a dependence of the concentration C on the temperature T.

The (functional) relationship between the concentration C of the active substance and the temperature T shown or described in the following is preferably a target relationship or a target curve, which is to be achieved by the control system or by means of the control system 24 for exhaust gas treatment. The control is therefore preferably performed in such a way that the course or functional relationship between the concentration C and the measured temperature T as shown in FIG. 12 and/or described in the following is at least approximately achieved or realized.

Preferably, at different temperatures T or in different temperature ranges TB there are different relationships between the concentration C and the temperature T. Thus, in different temperature ranges TB, the concentration C of the active substance discharged or injected into exhaust chamber 3 is preferably adapted differently to the (measured) temperature T.

In the following, three different temperature ranges TB1, TB2, TB3 will be discussed in particular, which are designated as the first, second and third temperature ranges TB1, TB2, TB3 for differentiation purposes. However, this does not imply a sequence of temperature ranges TB, nor does it imply that there must necessarily be three temperature ranges TB1, TB2, TB3. In particular, it is also possible that there are only two temperature ranges TB or that control is only performed differently in two temperature ranges TB, for example as described below for the first and third temperature ranges TB1 and TB3. The terms "first, second and third" temperature ranges TB1, TB2, TB3 are optional and interchangeable as required.

The same applies to the temperatures described below (first temperature T1, second temperature T2 and third temperature T3) and the concentrations assigned to these temperatures (first concentration C1, second concentration C2, third concentration C3) as for the temperature ranges TB1, TB2, TB3.

Preferably, the concentration C is varied continuously or steplessly in the method described below, especially in the first and/or second temperature range TB1, TB2. Preferably only a change of the concentration C in the atomized fluid or fluid mixture and/or no shut-off of the nozzle lance 2 is affected, at least in the first and/or second temperature range TB1, TB2.

It is preferable to increase the amount or concentration C of the active substance as the temperature T rises. In other words, the concentration C as a function of temperature T is preferably monotonic or strictly monotonic increasing. This preferably applies at least or exclusively in a first temperature range TB1 between a first temperature T1 and a second temperature T2, preferably where T2>T1. The first temperature T1 and the second temperature T2 form the lower and upper limit temperature and limit, respectively, of the first temperature range TB1.

For example, there can be at least an approximate linear, exponential, quadratic or other polynomial relationship between the concentration C and the temperature T, especially in the first temperature range TB1. However, other functional relations are also possible, for example an (at least approximate) logarithmic or root-like dependence of the concentration C on the temperature T.

Preferably, the concentration C of the active substance at the first temperature T1 has the value C1, so the functional relationship C(T=T1)=C1 applies. Similarly, the value of the concentration C at the second temperature T2 is designated by the reference sign C2, so that the following applies: C(T=T2)=C2.

Preferably, the second concentration C2 is unequal to the first concentration C1, especially preferably greater than the first concentration C1 (C2>C1).

The first temperature T1 is preferably at least about 800° C. and/or at most about 880° C., especially preferably about 840° C. However, the first temperature T1 or lower limit temperature of the first temperature range TB1 may also be chosen significantly lower, in particular so that it corresponds to the minimum temperature T when operating combustion plant 1.

The second temperature T2 is preferably at least about 940° C. and/or at most about 1,020° C., especially preferably about 980° C.

By increasing the concentration C with rising temperature T or decreasing the concentration C with falling temperature T, in particular the injection of too large a quantity of the active substance into exhaust gas chamber 3 can be changed. This prevents that a portion of the injected agent does not react with exhaust gas A or the pollutants. This excess or unused portion, also known as "slip", can cause unwanted contamination of the combustion plant 1 or exhaust chamber 3 by unused active fluid 5 or unused active substance. This slippage can be prevented or at least reduced by the above-mentioned change in quantity or concentration.

Preferably, below the first temperature T1, the concentration C is (further) reduced as the temperature T drops and/or no active substance is injected into the exhaust gas chamber 3. However, below the first temperature T1, the setting or control of the concentration C or amount of the active substance may be performed in the same way or in a similar way as in the first temperature TB1.

Preferably, outside the first temperature range TB1, a different setting or control of the concentration C of the active substance as a function of temperature T is performed than in the first temperature range TB1. Preferably, outside the first temperature range TB1, the functional relationship C(T) between the concentration C and the temperature T is different than in the first temperature range TB1.

The further or second temperature range TB2 is limited by the second temperature T2 and the further, third temperature T3, which is preferably larger than the second temperature T2 (T3>T2). The second and third temperature T2, T3 form the lower and upper limit temperature or limit of the second temperature range TB2. The value of the concentration C at the third temperature T3 is denoted in the following with the reference sign C3, so that C(T=T3)=C3 applies.

Preferably, in the second temperature range there is a different functional relationship C(T) between the concentration C and the temperature T than in the first temperature range TB1.

Preferably, the temperature C in the second temperature range TB2 is at least substantially constant and/or the second and third concentrations C2 and C3 are at least approximately equal C3). However, it is also possible that in the second temperature range TB2 a different, non-constant functional relationship C(T) between the concentration C and the temperature T applies. For example, the function C(T) in the second temperature range TB2 could rise (monotonically) and/or fall (monotonically) with a smaller slope than in the first temperature range TB1.

Alternatively or additionally, in the second temperature range TB2, for example, an at least approximately parabolic course or a quadratic relationship between the concentration C and the temperature T is possible.

The third temperature T3 is preferably at least about 1,000° C. and/or at most about 1,080° C., especially preferably about 1040° C.

The third temperature T3 is preferably a lower limit or limit temperature of a third temperature range TB3. The temperature range TB3 is preferably half open and/or not limited by an upper limit temperature.

Preferably, temperature T3 forms a limit temperature. If it is reached or exceeded, the amount or concentration C of the injected active substance is reduced or no active substance is injected. Thus, preferably C(T>T3)<C3 or C(T>T3)=0 applies. The function C(T) is for T>T3 or in the third temperature range TB3 preferably (strictly) monotonically decreasing and/or converging, for example exponentially decreasing, towards zero. Preferably, the graph of the function C(T) has a kink at the position T=T3 and/or the function C(T) is not differentiable at the position T=T3. Alternatively or additionally, the function C(T) exhibits a jump or discontinuity at the position T=T3.

Alternatively to the displayed function C(T), the concentration C can also decrease at temperatures T>T3 or in the third temperature range TB3 at least approximately linear, exponential, quadratic or according to another polynomial relation.

Preferably, in the event of a change in temperature T or a change in temperature in exhaust chamber 3—especially in a zone B—the quantity or concentration C of the active substance in the atomized fluid or fluid mixture—especially correspondingly in this zone B or an assigned spray zone SB—is adjusted or changed, especially to the changed temperature T.

According to another embodiment of the process, it may be provided, as an alternative or in addition to the features described above, to reduce the quantity of injected active substance below a limit temperature, in particular the second temperature T2, for example 980° C., and/or to control the nozzle lances 2 in such a way that the residence time for the active substance in the exhaust gas chamber 3 is increased. The dwell time is the time between the injection or atomization of the active substance and a (chemical) reaction of the active substance with exhaust gas A or with pollutants contained in exhaust gas A, in particular nitrogen oxides NOx.

A higher residence time can be achieved by increasing the droplet size in the spray S, for example. The droplet size can be increased in particular by reducing the pressure of pressurized gas 7. It may therefore be intended to reduce the pressure of the pressurized gas 7 below the limit temperature, in particular to increase the droplet size of the spray S and/or to cause a longer residence time of the active substance.

Alternatively or additionally, it may be provided that no active substance or active fluid 5 is injected into exhaust gas chamber 3 above a (further) limit temperature, in particular where this (further) limit temperature is about 1150° C. or corresponds to the third temperature T3. In this way a cooling of the exhaust gas A can be achieved. In addition, if active fluid 5, e.g. ammonia, is injected above the limit temperature, oxidation or combustion of active fluid 5 would occur, which would lead to an additional generation of nitrogen oxides NOx.

During the control or feedback-control process, an adjustment of the concentration C of the active substance in the atomized or injected fluid or fluid mixture cannot take place instantaneously as a matter of principle, but there is a so-called dead time between the time of measurement or detection of the temperature change or a change in other values measured by the measuring devices 22, 26 and the time at which the composition of the atomized fluid mixture or the concentration of the active substance in the injected fluid mixture—i.e. fluid mixture delivered to exhaust chamber 3 or zone B or SB—(actually) changes.

In control engineering, the dead time is generally defined as the time between a signal change at the system input and a corresponding signal response at the system output of a system. In the present method, the signal change at the system input is the measurement or recording of the temperature change or a change in other values measured by the measuring devices 22, 26 and the signal response is the injection of a fluid with a changed composition into exhaust chamber 3. In this case, the dead time is thus the time interval between the measurement of the change in the measured temperature, pollutant concentration and/or flow velocity or volume flow of exhaust gas A and the point in time at which the concentration C or quantity of the active substance in the fluid or fluid mixture injected or discharged into exhaust chamber 3 changes.

Preferably, the dead time for adjusting the quantity or concentration of the active substance in the atomized fluid mixture, in particular in response to a change in temperature T, pollutant concentration and/or flow velocity or volume flow of exhaust gas A in exhaust chamber 3 or a region thereof, is less than 5 s, preferably less than 1 s, particularly preferably less than 0.1 s, particularly less than 0.01 s. This is achieved in particular by mixing the admixing fluid 6 with the active fluid 5 (only) in the nozzle lance 2, in particular in the mixing zone 14 or only shortly before atomization or the atomization zone 18.

Such a short dead time is made possible in particular by the fact that the active fluid 5 is mixed with the admixing fluid 6 only shortly or immediately before atomization. Thus, there is only a very small "dead volume" in the nozzle lance 2, i.e. only a very small volume of the mixture of admixing fluid 6 and active fluid 5, which must first be discharged into exhaust chamber 3 before a fluid mixture with a modified composition or modified concentration C or quantity of the active substance can be injected into exhaust chamber 3 by changing the mixing ratio between active fluid 5 and admixing fluid 6. Preferably, the dead time depends essentially on the size of the dead volume, wherein a small dead volume results in a short dead time.

Accordingly, in the case of the nozzle lance 2, it is preferred that on the one hand a mixing zone 14 is provided first or upstream of the atomization zone 18 or that admixing fluid 6 is mixed with the active fluid 5, and on the other hand that the mixing zone 14 is only a short distance away from the atomization zone 18, especially a few centimeters.

In this way, a good or defined mixing of the active fluid 5 and the admixing fluid 6 to the fluid mixture to be atomized can be achieved on the one hand, and on the other hand a short dead time or fast adjustment and thus efficient exhaust gas cleaning.

Preferably, the temperature T is measured or determined separately in different zones B of exhaust chamber 3.

Alternatively or additionally it is also possible to measure the temperature T in different spray zones SB or planes E separately.

The spray zone SB of a nozzle lance 2 is in particular the zone which the spray S (primary) emitted by the nozzle lance 2 reaches or wets. This is shown schematically in FIG. 11.

Preferably each nozzle lance 2 has a spray zone SB or each nozzle lance 2 is assigned a spray zone SB. The spray zones SB of different nozzle lances 2 are preferably separated from each other or form disjunct areas, but they can also overlap.

Preferably one or more spray zones SB or nozzles 13 or nozzle lances 2 are assigned to one or each (measuring) zone B.

Alternatively or additionally the temperature T is measured in different planes E of the exhaust chamber 3. Preferably, the temperature T is measured in different zones B or sectors of one or each plane E, especially separately from each other.

Alternatively or additionally, it may be provided that a quantity or concentration of pollutants is measured separately in different zones B, planes E and/or spray zones SB of exhaust gas compartment 3.

In this way it is possible for individual nozzle lances 2 or for each nozzle lance 2 to measure or determine a temperature T and/or quantity of pollutant or concentration of pollutant assigned to the respective nozzle lance 2, so that the mixing ratio of admixing fluid 6 and active fluid 5 or the concentration C or quantity of active substance in the fluid or fluid mixture discharged or atomized by the nozzle lance 2 is set for each zone B, each spray zone SB, each plane E, each sector and/or each nozzle lance 2, in particular separately or individually.

In particular, it is also possible for the temperature T to be measured in a zone B or spray zone SB and/or in a plane E, with the adjustment of the quantity or concentration C of the injected active substance being carried out in another zone B or—if necessary additionally—in a zone B in which the temperature T and/or pollutant concentration has not been measured. In particular, the adjustment of the quantity or concentration C of the active substance in one zone B can thus be carried out on the basis of the temperature T and/or pollutant concentration measured in another zone B.

For example, it is possible to measure the temperature T in a plane E and, if necessary, to inject only water or admixing fluid 6 in a plane E located below or upstream of it in order to first reduce the exhaust gas temperature, in particular to a temperature T below the third limit temperature T3 or second limit temperature T, in order to then inject the active substance in the desired quantity or concentration C in the plane E in which or shortly before the temperature T is measured, i.e. to carry out or enable optimum exhaust gas treatment.

In addition or as an alternative to the aspects and characteristics already mentioned, a method for exhaust gas treatment in combustion plant 1 may have the aspects and characteristics described below.

Preferably, the measuring devices 21, 22, 26, the valves 10, the thermometers 23 and/or the control system 24 are calibrated, preset and/or adjusted to each other when the combustion plant 1 and/or the nozzle lances 2 are first put into operation.

Preferably, the control system 24 is controlled by the control system 24 as a function of the temperatures T measured by the thermometers 23 and/or the quantities or concentrations of pollutants, in particular nitrogen oxides NOx and/or sulphur oxides SOx, measured or determined by the measuring devices 22.

Preferably, the control system 24 adjusts the quantity and/or concentration of the active fluid 5, the admixing fluid 6, the fluid mixture 7 and/or the active substance, in particular on the basis of these signals, preferably so that optimum exhaust gas treatment or cleaning takes place.

In particular, it is also possible that no admixing fluid 6 is admixed to the active fluid 5 and/or that only the active fluid 5 is atomized by means of the pressurized gas 7. Preferably this is done above the limit temperature or third temperature T3 and/or for cooling the flue gas or exhaust gas A.

The control by the control system 24 can—if necessary after a calibration—be done especially automatically, preferably for which purpose the control system 24 has an appropriately designed computer or processor.

Preferably, the valves 10 or the nozzle lances 2 are adjusted or controlled individually, in areas and/or planes.

The control system 24 or the combustion plant 1 is preferably designed to adjust or control the admixing of the admixing fluid 6 to the active fluid 5, in particular the mixing ratio between active fluid 5 and admixing fluid 6, for one or each nozzle lance 2 and/or for one or each plane E individually or independently of other nozzle lances 2 and/or planes E.

Alternatively or additionally it may be provided that the control system 24 or the combustion plant 1 is designed to adjust or control the admixing of the pressurized gas 7 to the active fluid 5 and/or the admixing fluid 6 or the mixing ratio between active fluid 5, admixing fluid 6 and/or pressurized gas 7 individually for one or each nozzle lance 2 and/or one or each plane E.

Preferably the pressure of the pressurized gas 7 can be adjusted by the control system 24.

Preferably, a pressure between 3000 hPa and 6000 hPa, especially between 4000 hPa and 5000 hPa, is used for optimal exhaust gas treatment.

Preferably, the properties of the generated aerosol or spray S can be influenced or changed by the pressure of the pressurized gas 7, especially the throw distance and droplet size.

Preferably, these sizes can be adjusted or influenced alternatively or additionally by the shape and/or dimensioning of the nozzle lance 2, in particular nozzle 13.

Preferably, the inflow of the active fluid 5 and/or admixing fluid 6 is adjusted and/or controlled by means of a mass flow, a volume flow, an absolute quantity and/or a quantity per time unit of the respective fluid.

Preferably, a mass flow, volume flow, concentration, absolute quantity and/or quantity per time unit of the active substance is set and/or controlled. In particular, this can be done separately for each zone B, each spray zone SB, each plane E and/or each nozzle lance 2.

For exhaust gas treatment, the total quantity of fluids 5 and 6 supplied to the nozzle lances 2 is kept at least essentially constant, so that only the mixing ratio between the active fluid 5 and the admixing fluid 6 is changed.

Preferably, the pressure of pressurized gas 7 is also kept at least essentially constant. However, it is also possible to adapt the pressure to the total quantity of fluids 5 and 6 supplied to the nozzle lances 2 or to the mixing ratio of fluids 5 and 6.

The nozzle lance 2 or the combustion plant 1 is therefore particularly preferred to be operated in such a way that a volume or mass flow of the fluids 5 and/or 6 (regardless of their mixing ratio) is injected or atomized as constantly as possible, especially at a pressure of the pressurized gas 7 that is as constant as possible.

According to one embodiment of the method it is preferred that the quantity or the volume flow of the fluid or fluid mixture injected into the exhaust chamber 3 or discharged into the exhaust chamber 3 is kept constant and/or only the mixing ratio between active fluid 5 and admixing fluid 6 of the total fluid discharged into the exhaust chamber 3 and/or from one, in particular each, individual nozzle lance 2 is changed. Preferably, the quantity or concentration C of the injected active substance is adjusted or controlled exclusively or as the only parameter, especially when the temperature and/or the quantity or concentration of the pollutant changes.

According to another embodiment of the method, it is preferred that the (total) quantity or the mass flow or volume flow of the fluid or fluid mixture injected into exhaust chamber 3 or discharged into exhaust chamber 3 is variable and/or adapted to the measured values of the measuring devices 22 for measuring a quantity or concentration of pollutants, of the measuring devices 26 for measuring the volume flow or flow velocity of exhaust gas A and/or of the thermometer 23.

Particularly preferably, the total quantity or the mass or volume flow of the atomized fluid, the mixing ratio between active fluid 5 and admixing fluid 6 and/or the pressure of the pressurized gas 7 are continuously or steplessly varied or adjusted, especially (at least) in a certain or defined temperature range of the exhaust gas A.

The temperature range for stepless variation can be the first and/or second temperature range TB1, TB2 as explained above. In other designs, the lower limit of the temperature range for stepless variation may be 850° C., 900° C. or 950° C. and/or the upper limit of the temperature range may be 1,150° C., 1,100° C. or 1,050° C.

Preferably, the nozzle lances 2 are not switched off in the temperature range or the mass or volume flow of the atomized fluid and/or the active fluid 5 or active substance contained in the atomized fluid is not completely reduced, at least as long as the measured temperature is above the lower limit and/or below the upper limit of the temperature range.

The dependence of the mass or volume flow of the atomized fluid, the mixing ratio between active fluid 5 and admixing fluid 6, the pressure of the pressurized gas 7 and/or the concentration C of the active substance in the atomized fluid are preferably described by a continuous function.

The stepless variation is preferably carried out in the temperature range(s) mentioned above, but can also be carried out in only a part of the temperature range(s). It is also conceivable that outside the mentioned range a stepless variation takes place.

Preferably, the inflow of the pressurized gas 7 is adjusted and/or controlled by a pressure of the pressurized gas 7.

Preferably, the adjustment of the valves 10 can be done for each supply line 8, feed line 9, plane E, nozzle lance 2 and/or nozzle lance group separately, individually and/or independently of the other supply lines 8, feed lines 9, plane E, nozzle lance 2 and/or nozzle lance groups.

Preferably, combustion plant 1 or control system 24 is designed to perform an exhaust gas treatment method with the above features.

The method for exhaust gas treatment or cleaning can also be a method for desulphurization or flue gas desulphurization. The main difference between flue gas desulphurization and flue gas denitrification is that a different active fluid 5 or active agent is used. In particular, instead of an ammonia or urea solution, a calcium or lime-containing liquid such as lime water is used and/or the active substance contained in the active fluid 5 is in particular lime, calcium, calcium carbonate, calcium hydroxide or calcium oxide.

Accordingly, the measuring device 22 can be designed for the measurement of sulfur-containing compounds or sulfur oxides, in particular sulfur dioxide $SO_2$ and/or sulfur trioxide $SO_3$.

Further aspects of the present invention are in particular:

1. Nozzle lance (2) for atomizing an active fluid (5) by means of pressurized gas (7) for exhaust gas treatment, in particular for a combustion plant (1), with several supply lines (9) and a nozzle head (12), characterized in that the nozzle lance (2) has three feed lines (9), namely a first feed line (9A) for an active fluid (5), a second feed line (9B) for an admixing fluid (6) and a third feed line (9C) for the pressurized gas (7), and the admixing fluid (6) can be admixed to the active fluid (5) in the nozzle lance (2).
2. Nozzle lance according to aspect 1, characterized in that the first and second feed lines (9A, 9B) run in the third feed line (9C).
3. Nozzle lance according to aspect 1 or 2, characterized in that the nozzle lance (2) has a mixing zone (14) for admixing the admixing fluid (6) to the active fluid (5).
4. Nozzle lance according to aspect 3, characterized in that the mixing zone (14) is arranged completely within the nozzle lance (2) and/or at a distance from an outlet of the nozzle lance (2).
5. Nozzle lance according to aspect 3 or 4, characterized in that the mixing zone (14) is designed to form a purely liquid mixture of active fluid (5) and admixing fluid (6).
6. Nozzle lance according to one of aspects 3 to 5, characterized in that the first and second feed lines (9A, 9B) are fluidically connected to one another in the mixing zone (14), open into the mixing zone (14) or end in the mixing zone (14).
7. Nozzle lance according to one of the above aspects, characterized in that the nozzle lance (2) has an atomization zone (18) for admixing pressurized gas (7) to the mixture of active fluid (5) and admixing fluid (6) and/or the mixing zone (14) and the third feed line (9C) are fluidically connected to one another in an atomization zone (18) of the nozzle lance (2).
8. Nozzle lance according to aspect 7, characterized in that the third feed line (9C) is fluidically connected to the atomization zone (18) or opens into it, in particular by means of feeds (18A).
9. Nozzle lance according to aspect 8, characterized in that the feeds (18A) preferably run obliquely to a longitudinal axis (L) of the nozzle lance (2) and/or radially or to the main flow direction in the atomization zone (18) or nozzle head (12).
10. Nozzle lance according to one of the aspects 7 to 9, characterized in that the atomization zone (18) is arranged or formed downstream of the mixing zone (14) and/or separately from the mixing zone (14).
11. Nozzle lance according to one of the aspects 7 to 10, characterized in that the mixing zone (14) is arranged directly before the atomization zone (18), the nozzle (13) and/or the outlet of the nozzle lance (2) or the nozzle opening (13A).
12. Nozzle lance according to one of the aspects 7 to 11, characterized in that an intermediate or swirl zone (25) is arranged or formed between the mixing zone (14) and the atomizing zone (18).
13. Nozzle lance one of the aspects 3 to 12, characterized in that the nozzle lance (2) has a mixing part (15) for forming the mixing zone (14) and/or fluidic connection of the first and second feed lines (9A, 9B).
14. Nozzle lance according to aspect 13, characterized in that the mixing part (15) forms a separate, insertable and/or exchangeable component.
15. Nozzle lance according to aspect 13 or 14, characterized in that tubes (16A, 16B) for the active fluid (5) and the admixing fluid (6) are inserted or welded into the mixing part (15) of the nozzle lance (2).
16. Nozzle lance according to one of the preceding aspects, characterized in that the nozzle head (12) has a nozzle (13).
17. Nozzle lance according to aspect 16, characterized in that the nozzle (13) is a Laval nozzle.
18. Nozzle lance according to aspects 16 or 17, characterized in that the nozzle (13) forms the only outlet or the only outlet-side opening (13A) of the nozzle lance (2).
19. Nozzle lance according to one of the aspects 16 to 18, characterized in that the nozzle (13) is designed to produce a cone-like spray (S), in particular in the form of a hollow cone or full cone.
20. Nozzle lance according to one of the above aspects, characterized in that the first and second feed lines (9A, 9B) are parallel and/or adjacent to each other.
21. Nozzle lance according to one of the above aspects, characterized in that the first feed line (9A) runs in the second feed line (9B).
22. Nozzle lance according to one of the above aspects, characterized in that at least one valve (10) is associated with the nozzle lance (2) so that the inflow of the active fluid (5), admixing fluid (6) and/or pressurized gas (7) is adjustable.
23. Combustion plant (1), in particular large combustion plant, with a plurality of nozzle lances (2) assigned to a common exhaust gas chamber (3) for atomizing an active fluid (5) by means of pressurized gas (7) for exhaust gas treatment, each nozzle lance (2) having a plurality of feed lines (9) and a nozzle head (12), characterized in that the combustion plant (1) has fluidically separate supply lines (8) for an admixing fluid (6) and the active fluid (5), it being possible for the admixing fluid (6) to be admixed to the active fluid (5) in each case directly upstream of or in the nozzle lance (2), and/or in that the combustion plant (1) has a control system (24) with which inflows of the active fluid (5), admixing fluid (6) and/or pressurized gas (7) for individual or a plurality of nozzle lances (2) can be adjusted independently of other nozzle lances (2).

24. Combustion plant according to aspect 23, characterized in that the nozzle lances (2) are arranged in different planes (E) and/or groups, the inflow of the active fluid (5), admixing fluid (6) and/or pressurized gas (7) to the nozzle lances (2) being adjustable plane by plane and/or group by group.

25. Combustion plant according to aspect 23 or 24, characterized in that the combustion plant (1) and/or the control system (24) is designed to adjust or control the admixing of the admixing fluid (6) to the active fluid (5) for one or each nozzle lance (2) individually and/or independently of further nozzle lances (2).

26. Combustion plant according to one of the aspects 23 to 25, characterized in that the combustion plant (1) and/or the control system (24) is designed to adjust or control the admixing of the admixing fluid (6) to the active fluid (5) for one or each plane (E) individually and/or independently of further planes (E).

27. Combustion plant according to one of the aspects 23 to 26, characterized in that the combustion plant (1) and/or the control system (24) is designed to set or control the admixing of the pressurized gas (7) to the active fluid (5) and/or the admixing fluid (6) individually for one or each nozzle lance (2) and/or each plane (E)

28. Combustion plant (1), in particular large combustion plant, in particular according to one of the aspects 23 to 27, with an exhaust gas chamber (3), with several nozzles (13) or nozzle lances (2) for atomizing a fluid, in particular a fluid mixture of an admixing fluid (6) and an active fluid (5) with an active substance, by means of pressurized gas (7) for the exhaust gas treatment, with a control system (24) for controlling the exhaust gas treatment, and with a thermometer (23) for measuring a temperature (T) in the exhaust gas chamber (3), characterized in that the control system (24) is designed so that the control takes place as a function of the temperature (T) measured by the thermometer (23).

29. Combustion plant according to aspect 28, characterized in that the combustion plant (1) or the control system (24) is or are designed to set or control a quantity and/or concentration of the active fluid (5) and/or of the active substance as a function of the temperature (T).

30. Combustion plant according to aspect 28 or 29, characterized in that the thermometer (23) comprises or is formed by a pyrometer and/or a system for acoustic gas temperature measurement.

31. Combustion plant according to one of the aspects 28 to 30, characterized in that the combustion plant (1) is designed by means of the thermometer (23) and/or the control system (24) to measure the temperature (T) in different zones (B) of the exhaust gas chamber (3), in particular independently of each other.

32. Combustion plant according to any one of aspects 28 to 31, characterized in that the combustion plant (1) comprises several thermometers (23).

33. Combustion plant according to one of the aspects 28 to 32, characterized in that each zone (B) is assigned a nozzle lance (2), a thermometer (23) and/or a measuring device (22) for measuring a quantity or concentration of pollutants.

34. Combustion plant according to one of the aspects 28 to 33, characterized in that the combustion plant (1) is designed to change or adjust the quantity or concentration (C) of the active substance in the fluid or fluid mixture atomized or discharged into the exhaust gas chamber (3) in less than 5 s, preferably less than 1 s, in particular less than 0.1 s, particularly preferably less than 0.01 s, after the temperature (T) has been measured.

35. Combustion plant according to one of the aspects 23 to 34, characterized in that the nozzle lances (2) are designed according to one of the aspects 1 to 22.

36. Combustion plant according to one of the aspects 23 to 35, characterized in that the combustion plant (1) is designed to carry out a method according to one of the aspects 37 to 63.

37. Method for exhaust gas treatment, in particular in a combustion plant (1), preferably according to one of the aspects 23 to 36, wherein an active fluid (5) is atomized by means of pressurized gas (7) through several nozzle lances (2) into a common exhaust gas chamber (3) and wherein an admixing fluid (6) is admixed to the active fluid (5) before the atomization, characterized in that the active fluid (5) and the admixing fluid (6) are supplied separately to the nozzle lances (2), the admixing fluid (6) being admixed to the active fluid (5) in or directly upstream of the nozzle lances (2), and/or in that the inflows of the active fluid (5), admixing fluid (6) and/or pressurized gas (7) for individual or several nozzle lances (2) are adjusted independently of other nozzle lances (2).

38. Method according to aspect 37, characterized in that the admixing of the admixing fluid (6) to the active fluid (5) is set individually for one or each individual nozzle lance (2).

39. Method according to aspect 37 or 38, characterized in that the nozzle lances (2) are arranged in several planes (E) and the control of the inflow of the active fluid (5), admixing fluid (6) and/or pressurized gas (7) to the nozzle lances (2) is carried out plane by plane.

40. Method for exhaust gas treatment, preferably according to one of the aspects 37 to 39, in particular in a combustion plant (1), preferably according to one of the aspects 23 to 36, wherein a fluid, in particular a fluid mixture of an admixing fluid (6) and/or an active fluid (5) with an active substance, is injected by means of pressurized gas (7) through several nozzles or nozzle lances (2) into a common exhaust gas chamber (3) of the combustion plant (1), characterized in that a temperature (T) is measured in the exhaust gas chamber (3) and a quantity or concentration (C) of the active substance in the atomized fluid or fluid mixture is set or controlled as a function of the measured temperature (T).

41. Method according to aspect 40, characterized in that the amount or concentration (C) of the active substance is increased with increasing temperature (T), in particular in a first temperature range, preferably between about 800° C. and about 980° C.

42. Method according to aspect 40 or 41, characterized in that with increasing temperature (T) the amount or concentration (C) of the active substance is kept at least substantially constant, in particular in a second temperature range, preferably between about 980° C. and about 1040° C.

43. Method according to one of the aspects 40 to 42, characterized in that when a limit temperature is reached or exceeded, the amount or concentration (C) of the active substance injected is reduced or no active substance is injected.

44. Method according to one of the aspects 40 to 43, characterized in that the limit temperature is at least about 980° C., preferably at least about 1000° C., particularly preferably at least about 1040° C.

45. Method according to one of the aspects 40 to 44, characterized in that the total quantity of the fluids (5, 6) supplied to the nozzles or nozzle lances (2) and/or the volume flow of the atomized fluid or fluid mixture is kept at least substantially constant irrespective of the measured temperature (T).

46. Method according to one of the aspects 40 to 45, characterized in that the total quantity of the fluids supplied to the nozzles or nozzle lances (2) or the volume flow of the atomized fluid or fluid mixture is kept at least substantially constant independently of the mixing ratio between admixing fluid (6) and active fluid (5) or independently of the quantity or concentration (C) of the active substance.

47. Method according to one of the aspects 40 to 46, characterized in that when there is a temperature change, the amount or concentration (C) of the active substance in the atomized fluid mixture is adjusted or changed, wherein the dead time for adjusting the amount or concentration (C) of the active substance in the atomized fluid mixture is less than 5 s, preferably less than 1 s, in particular less than 0.1 s, particularly preferably less than 0.01 s, wherein the dead time is the time interval between the measurement of the temperature change and the point in time at which the concentration (C) or amount of the active substance in the atomized fluid or fluid mixture or in the fluid or fluid mixture discharged into the exhaust chamber (3) changes.

48. Method according to one of the aspects 40 to 47, characterized in that the temperature (T) is measured separately in different zones (B), preferably in different planes (E) and/or in different sections or sectors, in particular of one plane (E).

49. Method according to one of the aspects 40 to 48, characterized in that an amount or concentration of pollutants is measured separately in different zones (B), preferably in different planes (E) and/or in different sectors, in particular of one plane (E).

50. Method according to one of the aspects 40 to 49, characterized in that the amount or concentration (C) of the active substance in the atomized fluid or fluid mixture is adjusted separately for each zone (B), each plane (E), each sector and/or each nozzle lance (2).

51. Method according to one of the aspects 37 to 50, characterized in that the active fluid (5) and the admixing fluid (6) are mixed with each other within the nozzle lances (2), preferably directly before the atomization and/or injection.

52. Method according to one of the aspects 37 to 51, characterized in that the active fluid (5) and the admixing fluid (6) are mixed with each other to form a liquid fluid mixture.

53. Method according to one of the aspects 37 to 52, characterized in that first the active fluid (5) and the admixing fluid (6) are mixed together and only then the pressurized gas (7) is added.

54. Method according to one of the aspects 37 to 53, characterized in that the pressurized gas (7) is added to the active fluid (5) and/or the admixing fluid (6) inside the nozzle lance (2) and/or before or to the atomization.

55. Method according to one of the aspects 37 to 54, characterized in that the active fluid (5) is an ammonia solution or urea solution or contains ammonia or urea.

56. Method according to any of aspects 37 to 55, characterized in that the active substance is or contains ammonia or urea.

57. Method according to one of the aspects 37 to 56, characterized in that the active fluid (5) is lime water or contains lime or calcium.

58. Method according to one of the aspects 37 to 57, characterized in that the active substance is or contains lime, calcium oxide, calcium hydroxide, calcium carbonate and/or calcium.

59. Method according to one of the aspects 37 to 58, characterized in that the admixing fluid (6) is or contains water.

60. Method according to one of the aspects 37 to 59, characterized in that the method serves for flue gas cleaning.

61. Method according to one of the aspects 37 to 60, characterized in that the method serves for flue gas denitrification and/or that nitrogen oxides $NO_R$, in particular NO and/or $NO_2$, are removed from the exhaust gas (A) of the combustion plant (1).

62. Method according to one of the aspects 37 to 61, characterized in that the method serves for flue gas desulphurization and/or that sulphur compounds, in particular $SO_2$ and/or $SO_3$, are removed from the exhaust gas (A) of the combustion plant (1).

63. Method according to one of the aspects 37 to 62, characterized in that the fluid with the active fluid (5) or active substance is injected into the exhaust gas chamber (3) in different zones (B) and/or planes (E) via several nozzles (13) or nozzle lances (2), the quantity or concentration (C) of the active substance in the fluid of individual or groups of nozzles (13) or nozzle lances (2) being individually set, adapted or varied, in particular as a function of the temperature (T) in the respective zone (B) and/or the respective plane (E).

64. Method according to one of the aspects 37 to 63, characterized in that the nozzle lances (2) used are designed according to one of the aspects 1 to 22.

LIST OF REFERENCE SIGNS

1 Combustion plant
2 Nozzle lance
3 Exhaust gas chamber
3A Discharge channel
4 Tank
5 Active fluid
6 Admixing fluid
7 Pressurized gas
8 Supply line
8A Supply line for the active fluid 8B Supply line for the admixing fluid
8C Supply line for the pressurized gas
9 Feed line
9A Feed line for the active fluid
9B Feed line for the admixing fluid
9C Feed line for the pressurized gas
10 Valve
10A First valve
10B Second valve
10C Third valve
11 Wall
11A Intermediate wall
12 Nozzle head
13 Nozzle
13A Nozzle opening
14 Mixing zone
15 Mixing part
15A Channel
16 Tube
16A Tube for the active fluid
16B Tube for the admixing fluid
16C Tube for the pressurized gas
17A Openings
17B Openings
17C Mixing openings
18 Atomization zone
18A Feed
19 Holding piece
20 Connecting piece
21 Measuring device
22 Measuring device
23 Thermometer
24 Control system
25 Swirling zone
26 Measuring device
A Exhaust gas/main flow direction
B Zone
C Concentration
C1 (first) Concentration
C2 (second) Concentration
C3 (third) Concentration
E Plane
H Main discharge direction
L Longitudinal axis
S Spray
SB Spray zone
T Temperature
T1 (first) Temperature
T2 (second) Temperature
T3 (third) Temperature
TB1 (first) Temperature range
TB2 (second) Temperature range
TB3 (third) Temperature range
W Angle

The invention claimed is:

1. A method for exhaust gas treatment in a combustion plant comprising:
injecting a fluid with an active substance by pressurized gas through several nozzles or nozzle lances into a common exhaust gas chamber of the combustion plant, wherein the fluid is a fluid mixture of an admixing fluid and an active fluid with the active substance, wherein a temperature and/or a pollutant concentration is measured in the exhaust gas chamber and a quantity or concentration of the active substance in the atomized fluid is adjusted or controlled as a function of the measured temperature and/or pollutant concentration,
wherein in a temperature range of the exhaust gas between 850° C. and 1150° C. the quantity or concentration of the active substance in the atomized fluid is varied steplessly,
wherein a first temperature $T1$ and a second temperature $T2$ are in the temperature range between 850° C. and 1150° C., $T2>T1$ and the quantity or concentration of the active substance is monotonic increasing in a first temperature range $TB1$ between the first temperature $T1$ and the second temperature $T2$, and
wherein a third temperature $T3$ is in the temperature range between 850° C. and 1150° C., $T3>T2$, and the quantity or concentration of the active substance is constant in a second temperature range $TB2$ between the second temperature $T2$ and the third temperature $T3$.

2. The method according to claim 1, wherein a dead time during the variation is less than 5 s, wherein the dead time is the time interval between the measurement of the temperature change and a point in time at which the total quantity and the volume flow, the mixing ratio between active fluid and admixing fluid and the pressure of the pressurized gas of the atomized fluid changes.

3. The method according to claim 1, wherein nozzle lances are provided with several feed lines and a nozzle head arranged at an axial end of the nozzle lance, with at least one of the following features:
wherein the nozzle head has or forms three nozzles, wherein the main discharge directions of the first and second nozzles lie in a common plane, and the main discharge direction of the third nozzle runs obliquely to this plane, and/or
wherein the nozzle head has at least two nozzles, each of which has its own feed for feeding the pressurized gas to the active fluid inside the nozzles.

4. The method according to claim 2, wherein the dead time during the variation is less than 1 s.

5. The method according to claim 2, wherein the dead time during the variation is less than 0.1 s.

6. The method according to one claim 1, further comprising controlling by a control system of the combustion plant, the exhaust gas treatment, wherein the control system has measuring devices which measure the pressure of the pressurized gas and/or to measure inflows, one or more measuring devices for measuring or determining a quantity or concentration of pollutants, one or more thermometers for measuring temperatures in the exhaust gas chamber, and/or one or more measuring devices for measuring a volume flow and/or a flow velocity of the exhaust gas in exhaust gas chamber, wherein the control system controls the inflows to the nozzle lances and/or pressures of the pressurized gas on the basis of the signals or measured values of the measuring devices and/or the thermometers.

7. The method according to claim 1, wherein nozzle lances with several feed lines and a nozzle head arranged at an axial end of the nozzle lance are used for injection, wherein the nozzle head has at least two nozzles, each of which has its own feed for feeding the pressurized gas to the active fluid inside the nozzles.

8. The method according to claim 7, wherein the nozzle head has or forms three nozzles, namely a first nozzle, a second nozzle and a third nozzle, wherein the main discharge directions of the first and second nozzles lie in a common plane, and the main discharge direction of the third nozzle runs obliquely to this plane.

9. The method according to claim 8, wherein the third nozzle is arranged at a position where the distance between the third nozzle and the first nozzle and the distance between the third nozzle and the second nozzle is the same.

10. The method according to claim 8, wherein the main discharge directions of the nozzles are inclined and/or at an acute angle to a longitudinal axis of the nozzle lance.

11. The method according to claim 10, wherein the main discharge directions of the nozzles intersect the longitudinal axis of the nozzle lance.

12. The method according to claim 11, wherein the acute angle is at least 8° and/or at most 20°.

13. The method according to claim 7, wherein the nozzles form outlets of a common atomization zone or are fluidically connected to a common atomization zone.

14. The method according to claim 7, wherein during operation of the nozzle lance the same fluid mixture emerges or is atomized through each of the nozzles.

15. The method according to claim 7, wherein the nozzle lance has three feed lines, namely a first feed line for an active fluid, a second feed line for an admixing fluid and a third feed line for the pressurized gas.

16. The method according to claim 15, wherein the first and second feed lines are fluidically connected to one another in a mixing zone, open into the mixing zone or end in the mixing zone.

* * * * *